United States Patent
Tamano et al.

(10) Patent No.: US 11,475,808 B2
(45) Date of Patent: Oct. 18, 2022

(54) LIQUID CRYSTAL DISPLAY DEVICE, IMAGE DISPLAY SYSTEM AND VEHICLE

(71) Applicant: Rohm Co., Ltd., Kyoto (JP)

(72) Inventors: Yasuhiro Tamano, Kyoto (JP); Shinji Kawata, Kyoto (JP); Yoko Nomaguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 15 days.

(21) Appl. No.: 16/644,319

(22) PCT Filed: Sep. 7, 2018

(86) PCT No.: PCT/JP2018/033318
§ 371 (c)(1),
(2) Date: Mar. 4, 2020

(87) PCT Pub. No.: WO2019/050020
PCT Pub. Date: Mar. 14, 2019

(65) Prior Publication Data
US 2020/0193882 A1    Jun. 18, 2020

(30) Foreign Application Priority Data

Sep. 8, 2017 (JP) .............................. JP2017-172957
Sep. 8, 2017 (JP) .............................. JP2017-172960
Sep. 8, 2017 (JP) .............................. JP2017-172965

(51) Int. Cl.
*G09G 3/00* (2006.01)
*G09G 3/36* (2006.01)

(52) U.S. Cl.
CPC ........... *G09G 3/006* (2013.01); *G09G 3/3696* (2013.01); *G09G 2330/12* (2013.01); *G09G 2380/10* (2013.01)

(58) Field of Classification Search
CPC .. G09G 3/006; G09G 3/3696; G09G 2330/12; G09G 2380/10
See application file for complete search history.

(56) References Cited

U.S. PATENT DOCUMENTS

2005/0168491 A1* 8/2005 Takahara ............. G09G 3/3241
345/690
2016/0364029 A1* 12/2016 Miller .................... B60K 35/00
(Continued)

FOREIGN PATENT DOCUMENTS

JP            9-90396 A       4/1997
JP         2000-310982       11/2000
(Continued)

OTHER PUBLICATIONS

Japan Patent Office, International Search Report for PCT/JP2018/033318 dated Nov. 27, 2018, with English translation.

*Primary Examiner* — Stacy Khoo
(74) *Attorney, Agent, or Firm* — Fish & Richardson P.C.

(57) ABSTRACT

A liquid crystal display device includes a pixel array including a plurality of rows of gate lines, a plurality of columns of source lines, a plurality of switches, and a plurality of liquid crystal cells; a gate driver IC connected to the gate lines; a source driver IC connected to the source lines; a timing control IC arranged to control operation timings of the gate driver IC and the source driver IC; and a system power supply IC arranged to supply a power supply voltage to the source driver IC. Each of the timing control IC and the system power supply IC has a function of detecting an abnormality in the gate driver IC and an abnormality in the source driver IC.

23 Claims, 15 Drawing Sheets

(56) References Cited

U.S. PATENT DOCUMENTS

2017/0116943 A1    4/2017  Zhang et al.
2017/0162092 A1    6/2017  Kim et al.

FOREIGN PATENT DOCUMENTS

| | | |
|---|---|---|
| JP | 2001-92417 A | 4/2001 |
| JP | 2004-249836 | 9/2004 |
| JP | 2009-58685 A | 3/2009 |
| JP | 2010-188903 | 9/2010 |
| JP | 2011-110942 | 6/2011 |
| JP | 2014-115363 | 6/2014 |
| JP | 2015-047894 | 3/2015 |
| JP | 2015-219383 | 12/2015 |
| JP | 2017-068036 | 4/2017 |

\* cited by examiner

Fig. 10

| FAIL_DET1 | system power supply IC | | FAIL_DET2 | timing control IC | | source driver IC | gate driver IC | comprehensive determination |
|---|---|---|---|---|---|---|---|---|
| | I2C bus | determination | | I2C bus | determination | state | state | |
| High | responded | normal operation | High | responded | normal operation | OK | OK | no problem |
| High | responded | normal operation | Low | no response | no operation | - | - | display disabled |
| Low | no response | no operation | | | operation disabled (no power supply) | | | display disabled |
| Low | VON-NG | abnormal output | High | responded | normal operation | NG | NG | display disabled |
| Low | AVDD-NG | abnormal output | High | responded | normal operation | OK | OK | display disabled |
| Low | VIN-NG | output OFF | | | operation disabled (no power supply) | | | display disabled |
| High | responded | normal operation | Low | responded | source driver IC is NG | NG | OK | display disabled in left half, right half, or whole screen |
| High | responded | normal operation | Low | responded | image signal output is NG | no signal | OK | display disabled (no image signal) |
| High | responded | normal operation | Low | responded | gate driver IC is NG | - | NG | display disabled |
| High | responded | normal operation | Low | responded | image signal input is NG | OK | OK | display disabled |

LIQUID CRYSTAL DISPLAY DEVICE, IMAGE DISPLAY SYSTEM AND VEHICLE

TECHNICAL FIELD

The present invention relates to a liquid crystal display device.

BACKGROUND ART

A liquid crystal display device is used not only as an display of a television set or a monitor of a personal computer but also as a monitor or the like that displays an image around a vehicle taken by an on-vehicle camera, for example.

For instance, when a liquid crystal display device is used as a monitor that displays an image around a vehicle taken by an on-vehicle camera, in order to secure safety of the vehicle, a fault detection technique for the liquid crystal display device is particularly important.

Further, as one example of an image display system including a plurality of display devices, there is conventionally well known an image display system in which images around the vehicle taken by a plurality of on-vehicle cameras are displayed using a plurality of display devices in the vehicle.

For instance, the image display system proposed in Patent Document 1 includes a left side display device of a left mirror system and a right side display device of a right mirror system, and a center display device of a rear-view mirror system (see Paragraphs 0061 and 0062 of Patent Document 1). The left side display device displays an image taken by a left side camera that covers the left area of the vehicle. The right side display device displays an image taken by a right side camera that covers the right area of the vehicle. The center display device displays an image taken by a center camera that covers the back area of the vehicle.

Further, Patent Document 1 describes that when a fault occurs in imaging and displaying function of only the right mirror system, for example, the left side display device and the center display device may be informed about the fault. Further, Patent Document 1 describes that when a fault occurs in imaging and displaying function, an in-vehicle sound output device may output sound indicating that a fault has occurred in the imaging and displaying function.

LIST OF CITATIONS

Patent Literature

Patent Document 1: JP-A-2010-188903

SUMMARY OF THE INVENTION

Technical Problem

Patent Document 1 discloses that if the display device is a liquid crystal display device, it may be detected whether or not a fault has occurred in the liquid crystal display device by detecting whether or not there is an abnormality in a signal voltage for driving liquid crystal and a signal for driving a backlight of the liquid crystal display device (see Paragraph 0087 of Patent Document 1).

However, Patent Document 1 does not clarify how to specifically detect an abnormality in the signal voltage for driving liquid crystal. In particular, it is not clear how to correspond to the case where an integrated circuit (IC) cannot self-detect the abnormality.

Further, although the image display system proposed in Patent Document 1 can inform a driver in the vehicle about a fault in imaging and displaying function, it cannot provide the driver in the vehicle with an image that cannot displayed due to the fault in displaying function.

Further, in Patent Document 1, a control device that controls the display device outputs an inquiry signal to the display device, and on the basis of whether or not a response signal corresponding to the output is replied, presence or absence of a fault in the control device, the display device, and a cable connecting them is detected (see Paragraph 0052 of Patent Document 1). Furthermore, Patent Document 1 discloses that if the display device is a liquid crystal display device, presence or absence of a fault in the liquid crystal display device can be detected by detecting presence or absence of an abnormality in a signal voltage for driving liquid crystal and a signal for driving a backlight of the liquid crystal display device (see Paragraph 0087 of Patent Document 1).

However, in the fault detection technique proposed in Patent Document 1, presence or absence of a fault is detected on the basis of a signal or a voltage, and therefore it is difficult to detect partial peeling of a source driver integrated circuit (IC) from a substrate, partial peeling of a gate driver IC from the substrate, breakage of a liquid crystal panel, and the like, for example.

In view of the circumstances described above, a first object of the present invention is to provide a liquid crystal display device that can detect an abnormality even if an IC as a component of the liquid crystal display device cannot detect its abnormality by itself.

In view of the circumstances described above, a second object of the present invention is to provide an image display system including a plurality of display devices, which can securely notify about a fault when the fault has occurred in some of the display devices, and can output an image that the display device with the fault cannot display.

In view of the circumstances described above, a third object of the present invention is to provide a fault detection device arranged to detect a fault in the liquid crystal display device, which can easily detect a fault that can be hardly detected by signal-based or voltage-based detection.

Means for Solving the Problem

A liquid crystal display device disclosed in this specification includes a pixel array including a plurality of rows of gate lines, a plurality of columns of source lines, a plurality of switches, and a plurality of liquid crystal cells; a gate driver IC connected to the gate lines; a source driver IC connected to the source lines; a timing control IC arranged to control operation timings of the gate driver IC and the source driver IC; and a system power supply IC arranged to supply a power supply voltage to the source driver IC. Each of the timing control IC and the system power supply IC has a function of detecting an abnormality in the gate driver IC and an abnormality in the source driver IC (first structure).

In the liquid crystal display device having the first structure, it is possible to adopt a structure in which the timing control IC detects an abnormality in the source driver IC on the basis of a feedback signal from the source driver IC (second structure).

In the liquid crystal display device having the first or second structure, it is possible to adopt a structure in which the timing control IC detects an abnormality in the source driver IC on the basis of a voltage value of a control signal output to the source driver IC (third structure).

In the liquid crystal display device having any one of the first to third structures, it is possible to adopt a structure in which the timing control IC detects an abnormality in the gate driver IC on the basis of a feedback signal from the gate driver IC (fourth structure).

In the liquid crystal display device having any one of the first to fourth structures, it is possible to adopt a structure in which the system power supply IC detects an abnormality in the source driver IC on the basis of a power supply voltage value supplied to the source driver IC (fifth structure).

In the liquid crystal display device having any one of the first to fifth structures, it is possible to adopt a structure in which the liquid crystal display device includes a level shifter arranged to shift a level of the control signal supplied from the timing control IC and to send the same to the gate driver IC, and the system power supply IC detects an abnormality in the gate driver IC on the basis of a power supply voltage value supplied to the level shifter (sixth structure).

In the liquid crystal display device having any one of the first to sixth structures, it is possible to adopt a structure in which the system power supply IC detects an abnormality in the timing control IC on the basis of a power supply voltage value supplied to the timing control IC (seventh structure).

In the liquid crystal display device having any one of the first to seventh structures, it is possible to adopt a structure including a determination unit arranged to determine fault aspect of the liquid crystal display device on the basis of an abnormality detection result by the timing control IC and an abnormality detection result by the system power supply IC (eighth structure).

In the liquid crystal display device having any one of the first to eighth structures, it is possible to adopt a structure in which the timing control IC is a substantially rectangular semiconductor package having first to fourth sides in a plan view, the first side and the third side are opposed to each other, the second side and the fourth side are opposed to each other, at least some of a plurality of pins that receive an image signal are disposed on the first side, and at least some of a plurality of pins that supply output data to the gate driver IC and the source driver IC are disposed on the third side (ninth structure).

In the liquid crystal display device having the ninth structure, it is possible to adopt a structure in which the plurality of pins that receive the image signal are disposed on the first and second sides (tenth structure).

In the liquid crystal display device having the tenth structure, it is possible to adopt a structure in which the pins disposed on the first side so as to receive the image signal are disposed close to the second side on the first side, and the pins disposed on the second side so as to receive the image signal are disposed close to the first side on the second side (eleventh structure).

In the liquid crystal display device having the tenth or eleventh structure, it is possible to adopt a structure in which the number of pins disposed on the first side so as to receive the image signal is equal to or larger than the number of pins disposed on the second side so as to receive the image signal (twelfth structure).

In the liquid crystal display device having the ninth structure, it is possible to adopt a structure in which the plurality of pins that supply the output data to the gate driver IC and the source driver IC are disposed on the third side and the second side (thirteenth structure).

In the liquid crystal display device having the thirteenth structure, it is possible to adopt a structure in which the pins disposed on the third side so as to supply the output data to the gate driver IC and the source driver IC are disposed close to second side on the third side, and the pins disposed on the second side so as to supply the output data to the gate driver IC and the source driver IC are disposed close to the third side on the second side (fourteenth structure).

In the liquid crystal display device having the thirteenth or fourteenth structure, it is possible to adopt a structure in which the number of pins disposed on the third side so as to supply the output data to the gate driver IC and the source driver IC is equal to or larger than the number of pins disposed on the second side so as to supply the output data to the gate driver IC and the source driver IC (fifteenth structure).

In the liquid crystal display device having any one of the tenth to fifteenth structures, it is possible to adopt a structure in which at least either a pin that outputs a detection result about an abnormality in the gate driver IC and an abnormality in the source driver IC, or a pin that receives a detection result about the abnormality in the gate driver IC and the abnormality in the source driver IC supplied from the system power supply IC is disposed on the fourth side (sixteenth structure).

In the liquid crystal display device having any one of the ninth to sixteenth structures, it is possible to adopt a structure in which, in the timing control IC, a pin that outputs a first pulse signal to be a write start trigger for the source driver IC is disposed adjacent to a pin that receives a second pulse signal when writing of the source driver IC, which starts by the first pulse signal as a trigger, is normally performed (seventeenth structure).

In the liquid crystal display device having any one of the ninth to sixteenth structures, it is possible to adopt a structure in which, in the timing control IC, another pin is disposed between a pin that outputs a first pulse signal to be a write start trigger for the source driver IC, and a pin that receives a second pulse signal when writing of the source driver IC, which starts by the first pulse signal as a trigger, is normally performed (eighteenth structure).

An image display system disclosed in this specification is an image display system including a plurality of display devices, in which each of the plurality of display devices has a fault detection function of detecting a fault in itself. When a fault is detected in a certain display device among the plurality of display devices, at least either at least one display device other than the certain display device among the plurality of display devices or a notification device that performs notification other than display notifies that a fault is detected in the certain display device, and at least one display device other than the certain display device among the plurality of display devices displays an image for the certain display device (nineteenth structure).

In the image display system having the nineteenth structure, it is possible to adopt a structure in which, when a fault is detected in a certain display device among the plurality of display devices, at least one display device other than the certain display device among the plurality of display devices displays an image for itself and an image for the certain display device in a layout corresponding to a positional relationship between itself and the certain display device (twelfth structure).

In the image display system having the nineteenth or twelfth structure, it is possible to adopt a structure in which at least one of the plurality of display devices displays an image taken by a camera, the image display system includes an abnormality detection unit arranged to detects an abnormality in an image signal sent from the camera to the display device, and when the abnormality detection unit detects an abnormality in the image signal, at least either at least one display device other than the certain display device among the plurality of display devices or a notification device that performs notification other than display notifies that an abnormality in the image signal is detected (twenty-first structure).

In the image display system having any one of the nineteenth to twenty-first structures, it is possible to adopt a structure in which the display device is a liquid crystal display device including a pixel array including a plurality of rows of gate lines, a plurality of columns of source lines, a plurality of switches, and a plurality of liquid crystal cells; a gate driver IC connected to the gate lines; a source driver IC connected to the source lines; a timing control IC arranged to control operation timings of the gate driver IC and the source driver IC; and a system power supply IC arranged to supply a power supply voltage to the source driver IC, in which each of timing control IC and the system power supply IC has a function of detecting an abnormality in the gate driver IC and an abnormality in the source driver IC (twenty-second structure).

In the image display system having the twenty-second structure, it is possible to adopt a structure in which the timing control IC detects an abnormality in the source driver IC on the basis of a feedback signal from the source driver IC (twenty-third structure).

In the image display system having the twenty-second or twenty-third structure, it is possible to adopt a structure in which the timing control IC detects an abnormality in the source driver IC on the basis of a voltage value of a control signal output to the source driver IC (twenty-fourth structure).

In the image display system having any one of the twenty-second to twenty-fourth structures, it is possible to adopt a structure in which the timing control IC detects an abnormality in the gate driver IC on the basis of a feedback signal from the gate driver IC (twenty-fifth structure).

In the image display system having any one of the twenty-second to twenty-fifth structures, it is possible to adopt a structure in which the system power supply IC detects an abnormality in the source driver IC on the basis of a power supply voltage value supplied to the source driver IC (twenty-sixth structure).

In the image display system having any one of the twenty-second to twenty-sixth structures, it is possible to adopt a structure in which the liquid crystal display device includes a level shifter arranged to shift a level of the control signal supplied from the timing control IC, and the system power supply IC detects an abnormality in the gate driver IC on the basis of a power supply voltage value supplied to the level shifter (twenty-seventh structure).

In the image display system having any one of the twenty-second to twenty-seventh structures, it is possible to adopt a structure in which the system power supply IC detects an abnormality in the timing control IC on the basis of a power supply voltage value supplied to the timing control IC (twenty-eighth structure).

In the image display system having any one of the twenty-second to twenty-eighth structures, it is possible to adopt a structure in which the liquid crystal display device includes a determination unit arranged to determine fault aspect of the liquid crystal display device on the basis of an abnormality detection result by the timing control IC and an abnormality detection result by the system power supply IC (twenty-ninth structure).

In the image display system having any one of the twenty-second to twenty-ninth structures, it is possible to adopt a structure in which the timing control IC is a substantially rectangular semiconductor package having first to fourth sides in a plan view, the first side and the third side are opposed to each other, the second side and the fourth side are opposed to each other, the second side and the fourth side are opposed to each other, at least some of a plurality of pins that receive an image signal are disposed on the first side, and at least some of a plurality of pins that supply output data to the gate driver IC and the source driver IC are disposed on the third side (thirtieth structure).

In the image display system having the thirtieth structure, it is possible to adopt a structure in which the plurality of pins that receive the image signal are disposed on the first and second sides (thirty-first structure).

In the image display system having the thirty-first structure, it is possible to adopt a structure in which the pins disposed on the first side so as to receive the image signal are disposed close to the second side on the first side, and the pins disposed on the second side so as to receive the image signal pin are disposed close to the first side on the second side (thirty-second structure).

In the image display system having the thirty-first or thirty-second structure, it is possible to adopt a structure in which the number of pins disposed on the first side so as to receive the image signal is equal to or larger than the number of pins disposed on the second side so as to receive the image signal (thirty-third structure).

In the image display system having the thirtieth structure, it is possible to adopt a structure in which the plurality of pins that supply the output data to the gate driver IC and the source driver IC are disposed on the third side and the second side (thirty-fourth structure).

In the image display system having the thirty-fourth structure, it is possible to adopt a structure in which the pins disposed on the third side so as to supply the output data to the gate driver IC and the source driver IC are disposed close to second side on the third side, and the pins disposed on the second side so as to supply the output data to the gate driver IC and the source driver IC are disposed close to the third side on the second side (thirty-fifth structure).

In the image display system having the thirty-fourth or thirty-fifth structure, it is possible to adopt a structure in which the number of pins disposed on the third side so as to supply the output data to the gate driver IC and the source driver IC is equal to or larger than the number of pins disposed on the second side so as to supply the output data to the gate driver IC and the source driver IC (thirty-sixth structure).

In the image display system having any one of the thirty-first to thirty-sixth structures, it is possible to adopt a structure in which at least either a pin that outputs a detection result about an abnormality in the gate driver IC and an abnormality in the source driver IC, or a pin that receives a detection result about the abnormality in the gate driver IC and the abnormality in the source driver IC supplied from the system power supply IC is disposed on the fourth side (thirty-seventh structure).

In the image display system having any one of the thirtieth to thirty-seventh structures, it is possible to adopt a structure in which, in the timing control IC, a pin that outputs a first pulse signal to be a write start trigger for the source driver IC is disposed adjacent to a pin that receives a second pulse signal when writing of the source driver IC, which starts by the first pulse signal as a trigger, is normally performed (thirty-eighth structure).

In the image display system having any one of the thirtieth to thirty-seventh structures, it is possible to adopt a structure in which, in the timing control IC, another pin is disposed between the pin that outputs the first pulse signal to be a write start trigger for the source driver IC and a pin that receives a second pulse signal when writing of the source driver IC, which starts by the first pulse signal as a trigger, is normally performed (thirty-ninth structure).

A fault detection device disclosed in this specification includes an obtaining unit arranged to obtain a detection result by a current detection unit that detects at least either charging current or discharging current of a pixel array, which includes a plurality of rows of gate lines, a plurality of columns of source lines, a plurality of switches, and a plurality of liquid crystal cells; and a fault detection unit arranged to detect a fault in a liquid crystal display device including the pixel array on the basis of a detection result by the current detection unit obtained by the obtaining unit (fortieth structure).

In the fault detection device having the fortieth structure, it is possible to adopt a structure in which a display region of the pixel array is divided into a plurality of divided areas, the obtaining unit obtains a detection result by the current detection unit when only a display of one of the divided areas is changed (forty-first structure).

In the fault detection device having the fortieth or forty-first structure, it is possible to adopt a structure in which the fault detection unit detects a fault in the liquid crystal display device including the pixel array at non-initial time, on the basis of a comparison result between a detection result by the current detection unit obtained by the obtaining unit at initial time and a detection result by the current detection unit obtained by the obtaining unit at the non-initial time (forty-second structure).

In the fault detection device having the forty-second structure, it is possible to adopt a structure in which the fault detection unit detects a fault in the liquid crystal display device including the pixel array at the non-initial time and when a backlight to illuminate the pixel array is turned off, on the basis of a comparison result between a detection result by the current detection unit obtained by the obtaining unit at the initial time and a detection result by the current detection unit obtained by the obtaining unit at the non-initial time and when the backlight is turned off (forty-third structure).

In the fault detection device having any one of the fortieth to forty-third structures, it is possible to adopt a structure in which faults in the liquid crystal display device detected by the fault detection unit include a physical breakdown of the pixel array (forty-fourth structure).

In the fault detection device having any one of the fortieth to forty-fourth structures, it is possible to adopt a structure in which faults in the liquid crystal display device detected by the fault detection unit include an abnormality in a source driver IC that applies a voltage to the source line (forty-fifth structure).

In the fault detection device having any one of the fortieth to forty-fifth structures, it is possible to adopt a structure in which faults in the liquid crystal display device detected by the fault detection unit include an abnormality in a gate driver IC that applies a voltage to the gate line (forty-sixth structure).

A liquid crystal display device disclosed in this specification includes a pixel array including a plurality of rows of gate lines, a plurality of columns of source lines, a plurality of switches, and a plurality of liquid crystal cells; a current detection unit arranged to detect at least either charging current or discharging current of the pixel array; and the fault detection device having any one of the fortieth to forty-sixth structures (forty-seventh structure).

In the liquid crystal display device having the forty-seventh structure, it is possible to adopt a structure in which the current detection unit detects current flowing in a first power supply line that supplies a power supply voltage of the source driver IC to a source driver IC that applies a voltage to the source line, or current flowing in a second power supply line that supplies a power supply voltage to a gate driver IC that applies a voltage to the gate line (forty-eighth structure).

In the liquid crystal display device having the forty-eighth structure, it is possible to adopt a structure in which the current detection unit includes a resistor disposed in the first power supply line or the second power supply line, a first voltage divider circuit that divides a voltage at one end of the resistor, and a second voltage divider circuit that divides a voltage at the other end of the resistor (forty-ninth structure).

In the liquid crystal display device having the forty-seventh or forty-eighth structure, it is possible to adopt a structure including a correction unit arranged to correct a detection variation of the current detection unit (fiftieth structure). Further, in the liquid crystal display device having the forty-ninth structure, it is possible to adopt a structure in which the liquid crystal display device includes a correction unit arranged to correct a detection variation of the current detection unit, and the current detection unit includes a voltage correction circuit arranged to correct a voltage output from the first voltage divider circuit, and the correction unit includes the voltage correction circuit (fifty-first structure).

A vehicle disclosed in this specification includes at least one of the liquid crystal display device having any one of the first to eighteenth structures, the image display system having any one of the nineteenth to thirty-ninth structures, and the liquid crystal display device having any one of the forty-seventh to fifty-first structures (fifty-second structure).

Advantageous Effects of the Invention

According to the liquid crystal display device disclosed in this specification, even if an IC as a structural component of the liquid crystal display device cannot detect its abnormality by itself, the abnormality can be detected.

According to the image display system disclosed in this specification, when a fault occurs in some of display devices, the fault can be securely notified, and the image that the display device with the fault cannot display can be output.

According to the fault detection device disclosed in this specification, a fault in the liquid crystal display device, which can be hardly detected by a signal-based or voltage-based detection, can be easily detected.

BRIEF DESCRIPTION OF DRAWINGS

FIG. 10 is a table showing determination details of abnormalities.

DESCRIPTION OF EMBODIMENTS

<1. Structure etc. of Image Display System>

An image display system 1 described later is mounted in a vehicle 101 illustrated in FIG. 1, for example. When the image display system 1 described later is mounted in the vehicle 101 illustrated in FIG. 1, the image display system 1 described later is configured to include at least two display devices out of a center information display (CID) 102 that displays a map for a navigation system, for example, an instrument cluster 103, display devices 104L and 104R of an electronic side mirror system, and a display device 105 of an electronic rear-view mirror system (see FIG. 2). Note that the instrument cluster 103 may be constituted of a single liquid crystal display device that performs display for a plurality of measuring instruments, or may be constituted of a plurality of liquid crystal display devices, each of which performs display for at least one measuring instrument.

In the following description, there is exemplified a case where the image display system 1 includes the instrument cluster 103, and the display devices 104L and 104R of the electronic side mirror system, in which the instrument cluster 103 is constituted of a single liquid crystal display device that performs display for a plurality of measuring instruments.

Figure 3:
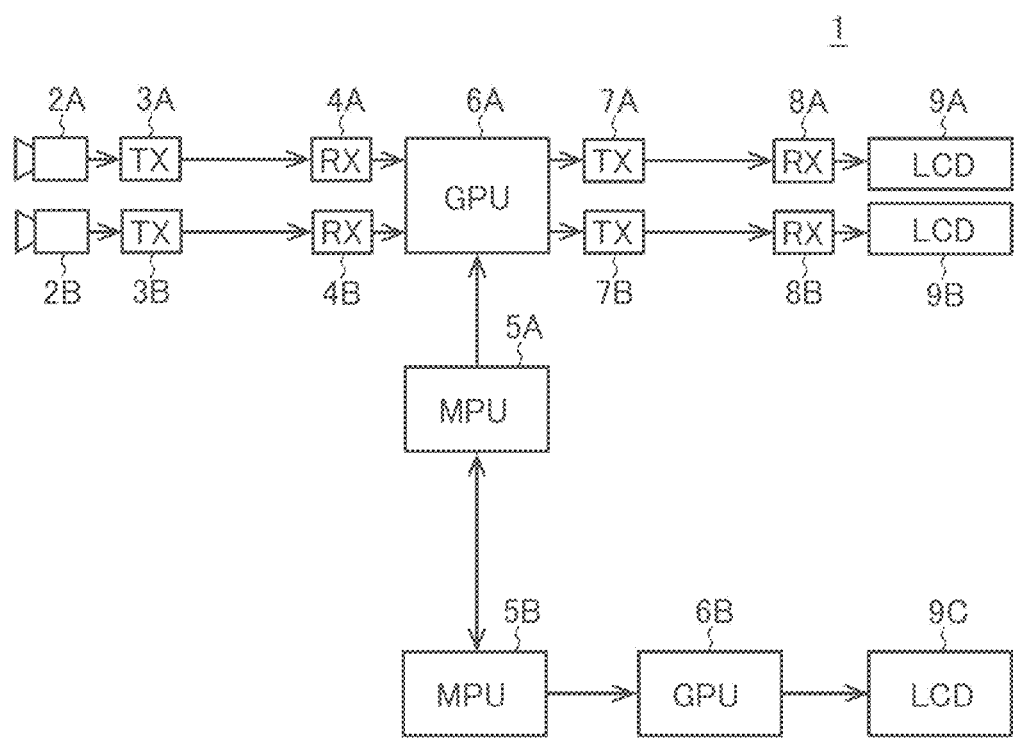
FIG. 3 is a block diagram illustrating a structure of an image display system according to one example.

FIG. 3 is a block diagram illustrating a structure of the image display system 1 according to one example. The image display system 1 includes micro-processing units (MPUs) 5A and 5B, graphics processing units (GPUs) 6A and 6B, transmitters 7A and 7B, receivers 8A and 8B, and liquid crystal display devices 9A to 9C. The liquid crystal display device 9A is used as the display device 104L. The liquid crystal display device 9B is used as the display device 104R. The liquid crystal display device 9C is used as the instrument cluster 103.

A camera 2A that takes an image of the left side and the rear left side of the vehicle 101 is connected to the GPU 6A of the image display system 1 via a transmitter 3A and a receiver 4A. A camera 2B that takes an image of the right side and the rear right side of the vehicle 101 is connected to the GPU 6A of the image display system 1 via a transmitter 3B and a receiver 4B.

The GPU 6A is controlled by the MPU 5A. The GPU 6A sends a taken image signal, which is sent from the camera 2A via the transmitter 3A and the receiver 4A, to the display device 9A via the transmitter 7A and the receiver 8A. Further, the GPU 6A sends a taken image signal, which is sent from the camera 2B via the transmitter 3B and the receiver 4B, to the display device 9B via the transmitter 7B and the receiver 8B.

The GPU 6B is controlled by the MPU 5B. The MPU 5B obtains output information from various sensors (such as a vehicle speed sensor, an engine rotational frequency detection sensor, and a remaining fuel amount detection sensor) via an in-vehicle communication network such as a local interconnect network (LIN), a controller area network (CAN), a media oriented systems transport (MOST), and sends the obtained output information from various sensors to the GPU 6B. The GPU 6B generates an image signal for displaying the output information from various sensors for a driver on the basis of the output information from various sensors, and sends the generated image signal to the liquid crystal display device 9C in a low voltage differential signaling (LVDS) signal form. Note that, instead of the in-vehicle communication network described above, a communication network such as Ethernet may be used, or wireless communication such as Bluetooth (registered trademark) or Wi-Fi (registered trademark) may be used.

<2. Structure etc. of Liquid Crystal Display Device>

Figure 4:
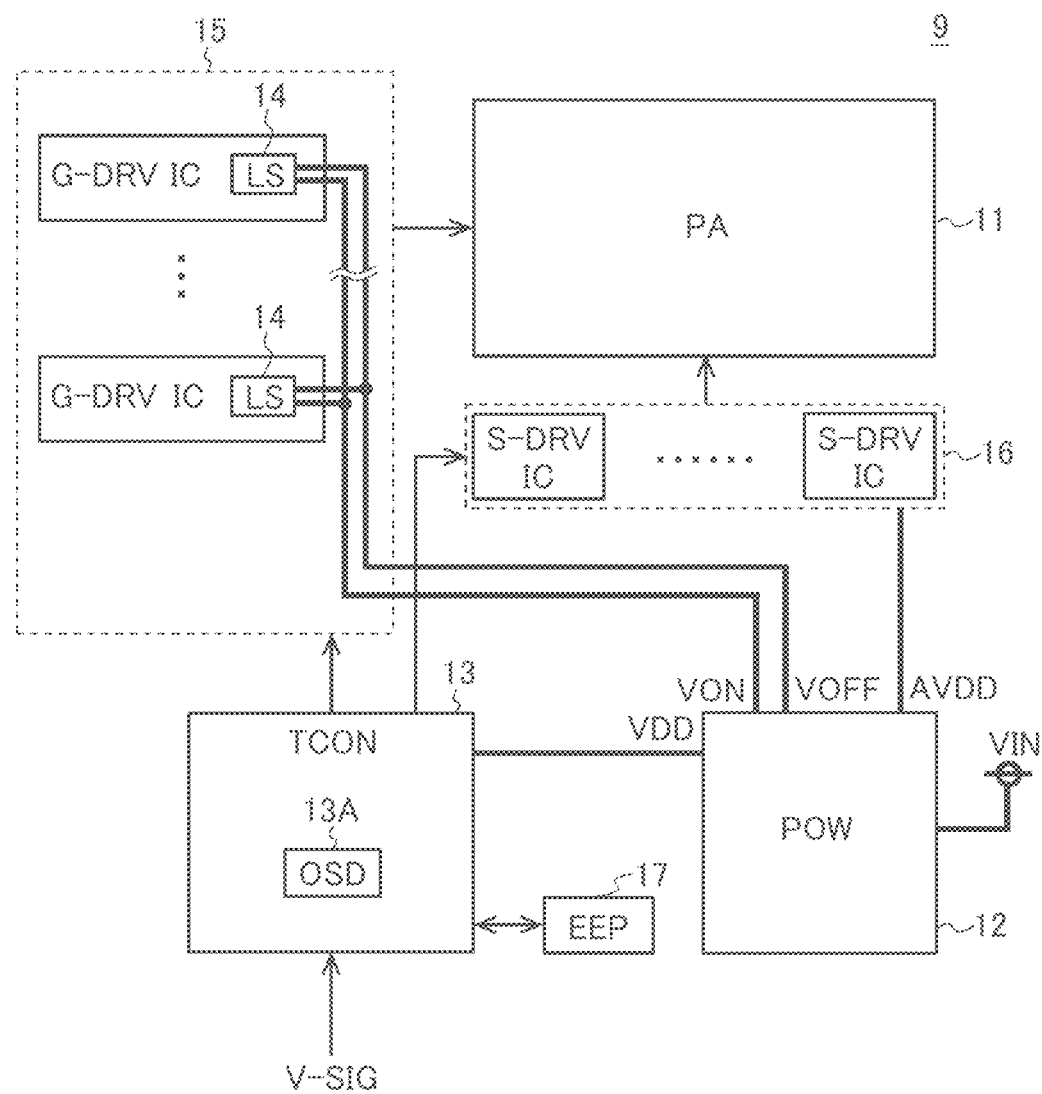
FIG. 4 is a block diagram illustrating a structure of a liquid crystal display device according to one example.

Next, a structural example of the liquid crystal display device 9 (the liquid crystal display devices 9A to 9C) is described. FIG. 4 is a block diagram illustrating a structure of the liquid crystal display device 9. The liquid crystal display device 9 includes a pixel array 11, a system power supply IC 12, a timing control IC 13, a gate driver 15, a source driver 16, and a backlight (not shown). The gate driver 15 includes a plurality of gate driver ICs. Each of the gate driver ICs includes a level shifter 14 and a switch (not shown) on its output stage.

Figure 5:
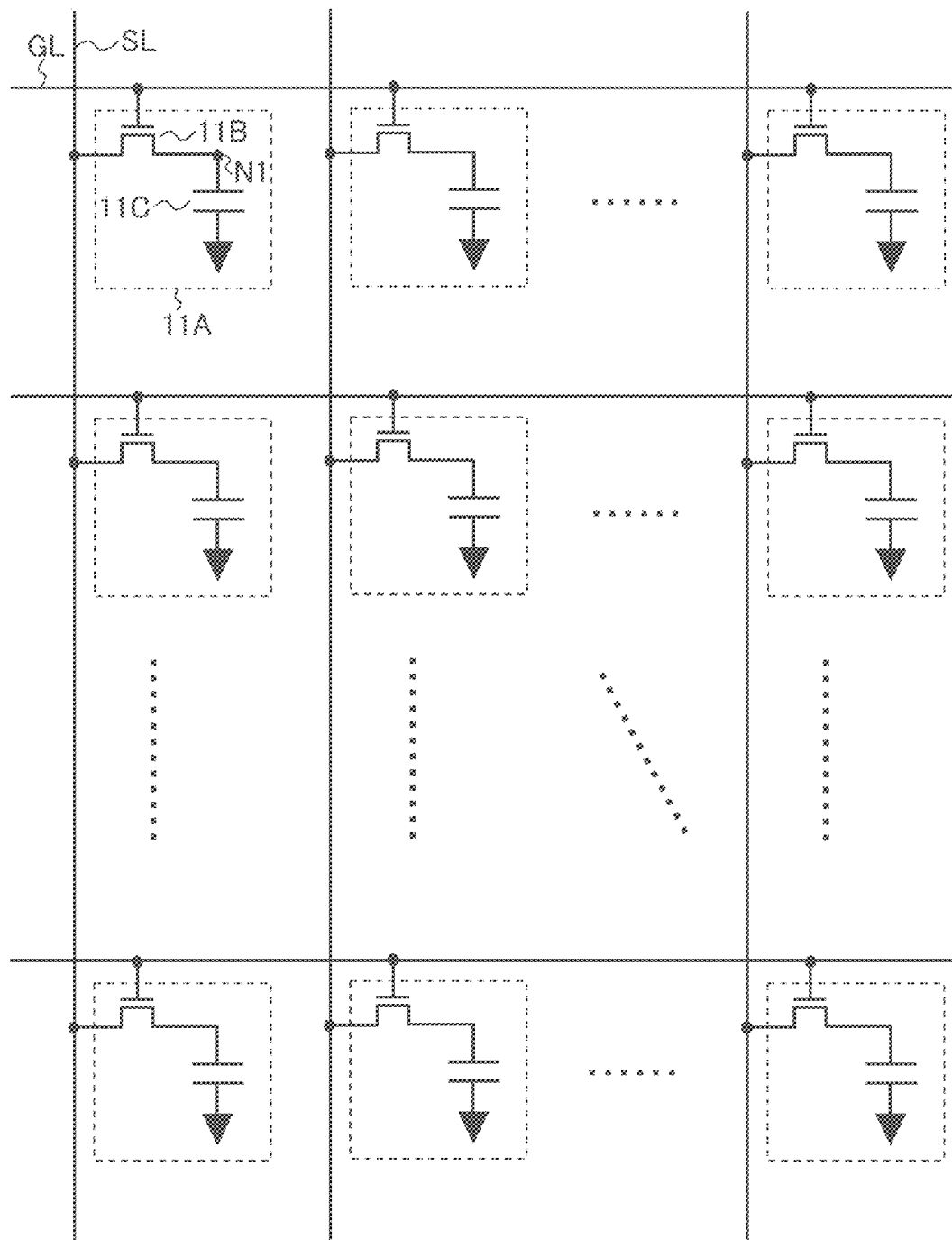
FIG. 5 is a diagram illustrating one structural example of a pixel array.

As illustrated in FIG. 5, the pixel array 11 includes a plurality of pixel circuits 11A disposed in a plurality of rows and a plurality of columns, a plurality of gate lines GL disposed corresponding to the plurality of rows, and a plurality of source lines SL disposed corresponding to the plurality of columns. One end of each gate line GL is connected to the gate driver 15. One end of each source line SL is connected to the source driver 16.

The pixel circuit 11A includes a thin film transistor (TFT) 11B and a liquid crystal cell 11C. Note that, instead of the TFT of this example, a switch other than the TFT, which can be turned on and off by a voltage applied to the gate line GL, may be used. A gate of each TFT 11B is connected to the corresponding gate line GL. A source of each TFT 11B is connected to the corresponding source line SL. A drain of each TFT 11B is connected to a common line (not shown) to which a common voltage is applied via the corresponding liquid crystal cell 11C. The liquid crystal cell 11C includes two transparent electrodes opposed to each other, and liquid crystal filled between the two transparent electrodes.

When the gate line GL is low level, i.e. when a negative power supply voltage VOFF described later is applied to the gate line GL, the TFT 11B is off. On the contrary, when the gate line GL is high level, i.e. when a positive power supply voltage VON described later is applied to the gate line GL, the TFT 11B is on. When the TFT 11B is on, a voltage of the source line SL is written in a storage node N1 between the drain of the TFT 11B and the liquid crystal cell 11C, and the voltage written in the storage node N1 is sustained by the storage node N1 when the TFT 11B is switched from on to off. Light transmittance of the liquid crystal cell 11C changes depending on the voltage written in the storage node N1. If the pixel array 11 is a normally white type, the light transmittance of the liquid crystal cell 11C becomes maximum when the voltage written in the storage node N1 is equal to the above-mentioned common voltage. On the contrary, if the pixel array 11 is a normally black type, the light transmittance of the liquid crystal cell 11C becomes minimum when the voltage written in the storage node N1 is equal to the above-mentioned common voltage.

With reference to FIG. 4 again, the system power supply unit 12 operates when an input voltage VIN (e.g. +5 V) is supplied, generates an analog power supply voltage AVDD (e.g. +13 V), a logic power supply voltage VDD (e.g. +3.3 V, +1.8 V, or +1.2 V), the positive power supply voltage VON (e.g. +28 V), and the negative voltage VOFF (e.g. −12 V), and supplies the voltages to individual portions of the device.

The timing control IC 13 operates when the logic power supply voltage VDD is supplied, and controls operation timings of the gate driver 15 and the source driver 16 on the basis of an image signal V-SIG supplied from a GPU that is not shown in FIG. 4, for example. Note that, unlike this embodiment, the timing control IC 13 may operate when a power supply voltage is supplied from an external power supply disposed outside the liquid crystal display device.

The level shifter 14 in the gate driver IC operates when the positive power supply voltage VON and the negative power supply voltage VOFF are supplied, and performs level shift of a control signal supplied from the timing control IC 13.

The gate driver 15 sequentially selects the plurality of gate lines GL of the pixel array 11 one by one for a predetermined time each. The gate driver 15 sets the selected gate line GL to high level.

In this example, the gate driver 15 includes the plurality of gate driver ICs as described above. Each gate driver IC is assigned with a plurality of gate lines GL, and each gate line GL is connected to one of the gate driver ICs. Note that, unlike this embodiment, the gate driver 15 may be constituted of a single gate driver IC.

Further, in this example, the gate driver ICs are mounted on a glass substrate of the liquid crystal panel as chip on glass (COG). Note that, unlike this embodiment, the gate driver ICs may not be mounted on the glass substrate but may be mounted on a substrate (such as a printed wiring board) other than the glass substrate. Further, unlike this embodiment, it may be possible to use a panel type including a pixel array and a circuit portion corresponding to output stage switches of the gate driver ICs (a panel type called a gate in panel (GIP) or a gate on array (GOA)). If this panel type is used, only a circuit portion corresponding to the output stage switches out of the gate driver ICs is formed on the liquid crystal panel, and the level shifter 14 is disposed externally of the liquid crystal panel.

The source driver 16 writes a voltage of a level corresponding to the image signal V-SIG in the storage node N1 of each pixel circuit 11A corresponding to the gate line GL selected by the gate driver 15, via each source line SL.

In this example, the source driver 16 includes a plurality of source driver ICs. Each source driver IC is assigned with a plurality of source lines SL, and each source line SL is connected to one of the source driver ICs. Note that, unlike this embodiment, the source driver 16 may be constituted of a single source driver IC.

Further, in this example, the source driver ICs are mounted on the glass substrate of the liquid crystal panel as chip on glass (COG). Note that, unlike this embodiment, the source driver ICs may not be mounted on the glass substrate but may be mounted on a substrate (such as a printed wiring board) other than the glass substrate.

The backlight (not shown) illuminates the back surface of the pixel array 11. Light entering the back surface of the pixel array 11 goes out from the front surface of the pixel array 11, after intensity thereof is adjusted in each pixel of the pixel array 11 in accordance with the light transmittance of the liquid crystal cell 11C.

The liquid crystal display device 9 further includes an electrically erasable programmable read-only memory (EE-PROM) 17. The EEPROM 17 stores a positional relationship between the liquid crystal display device including the EEPROM 17 and other liquid crystal display device, and other information. Instead of the EPROM 17, a nonvolatile memory other than the EPROM 17 may be used. The timing control IC 13 includes an OSD unit 13A that generates OSD display data for displaying an on screen display (OSD) of information about faults on the liquid crystal display screen.

The liquid crystal display device 9 having the structure described above has a fault detection function of detecting its fault (abnormality). Details of the fault detection function will be described later.

<3. Notification of Fault>

Here, an operation of the image display device 1 when a fault is detected is described with reference to an example in which the liquid crystal display device 9A detects a fault.

When the liquid crystal display device 9A detects a fault, the liquid crystal display device 9A informs the MPU 5A that a fault has occurred in itself. The MPU 5A informs the MPU 5B that a fault has occurred in the liquid crystal display device 9A using the in-vehicle communication network. Further, the MPU 5A makes the GPU 6A perform a process of decreasing a resolution of the taken image signal sent from the camera 2A, and then informs the MPU 5B of the taken image signal sent from the camera 2A after the resolution decreasing process, using the in-vehicle communication network.

When the MPU 5B knows that a fault has occurred in the liquid crystal display device 9A, the MPU 5B controls the liquid crystal display device 9C to display that a fault has occurred in the liquid crystal display device 9A, and controls the liquid crystal display device 9C to display an image taken by the camera 2A. In this way, when a fault has occurred in some of display devices (the liquid crystal display device 9A in this example), the fault can be securely notified, and the image that the display device with the fault (the liquid crystal display device 9A in this example) cannot display can be output.

When the MPU 5B knows that a fault has occurred in the liquid crystal display device 9A, the MPU 5B makes the GPU 6B perform a process of decreasing a resolution of the display image about the plurality of measuring instruments.

Figure 6:
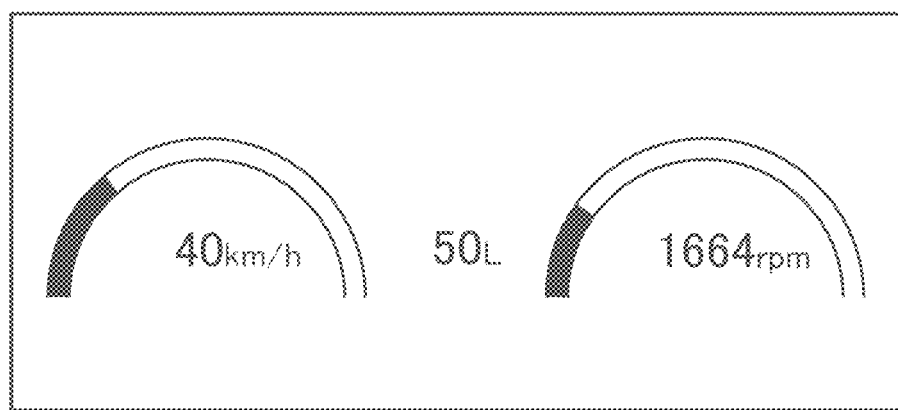
FIG. 6 is a diagram illustrating a display example of an instrument cluster.
Figure 7:
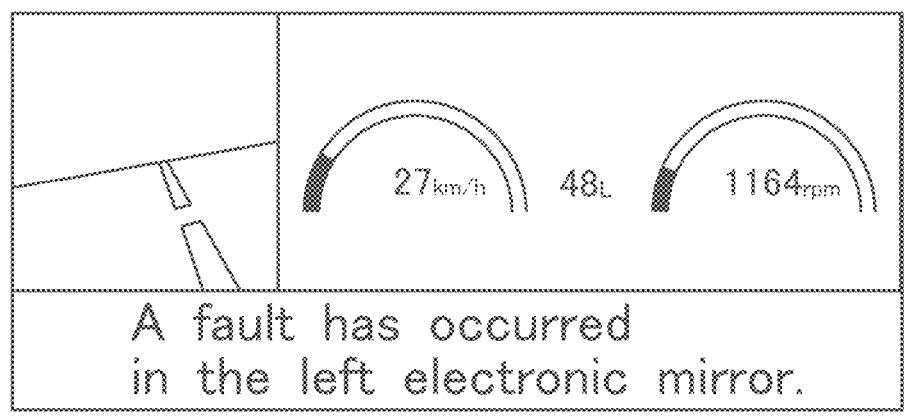
FIG. 7 is a diagram illustrating another display example of the instrument cluster.

Note that the image taken by the camera 2A and the display image about the plurality of measuring instruments are displayed by the liquid crystal display device 9, preferably in a layout corresponding to the positional relationship between the liquid crystal display device 9A (liquid crystal display device 104L) and the liquid crystal display device 9C (instrument cluster 103). In other words, viewed from a driver, the liquid crystal display device 9A (liquid crystal display device 104L) is positioned on the left side of the liquid crystal display device 9C (instrument cluster 103), and hence it is preferred that the liquid crystal display device 9C (instrument cluster 103) should perform the display shown in FIG. 6 when a fault has not occurred in the liquid crystal display device 9A, and that when a fault has occurred in the liquid crystal display device 9A, the liquid crystal display device 9C (instrument cluster 103) should set a display region of the image taken by the camera 2A on the left side of the display region of the display image about the plurality of measuring instruments, viewed from the driver, as shown in FIG. 7. In this way, the display on the liquid crystal display device 9C (instrument cluster 103) when a fault has occurred in the liquid crystal display device 9A (liquid crystal display device 104L) becomes a display that can be easily recognized by the driver.

Furthermore, it is possible to configure so that the MPU 5A detects abnormality in the image signal in the path from the camera 2A to the GPU 6A, and detects an abnormality in the image signal in the path from the camera 2B to the GPU 6A, and when the abnormality is detected, the liquid crystal display device 9C may notify that the abnormality has occurred. The abnormality in the image signal in the path from the camera 2A or 2B to the GPU 6A may be detected using CRC data for monitoring freeze of image, for example, and in order to monitor a fault in the camera 2A or 2B itself, the GPU 6A may inquire the camera 2A or 2B about its status using bidirectional communication between the GPU 6A and the camera 2A or 2B.

<4. Fault Detection>

Next, the fault detection function of the liquid crystal display device 9 is described. In the liquid crystal display device 9, each of the system power supply IC 12 and the timing control IC 13 has a function of detecting an abnormality in the gate driver IC and an abnormality in the source driver IC.

Figure 8:
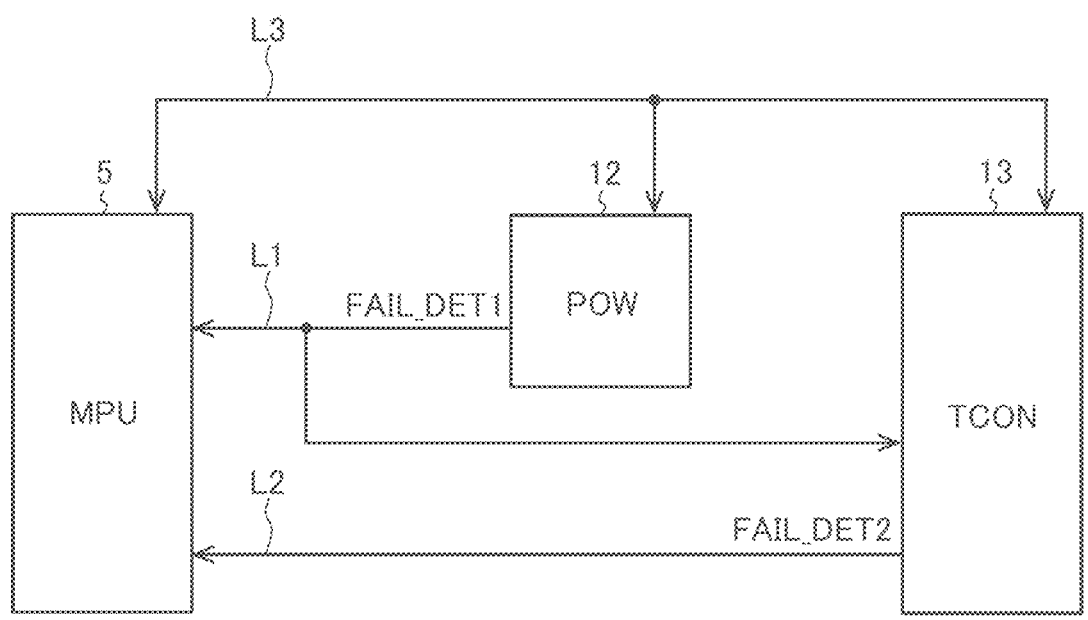
FIG. 8 is a block diagram illustrating a schematic connection relationship of a timing control IC, a system power supply IC, and an MPU.

As illustrated in FIG. 8, the system power supply IC 12 informs each of the MPU 5 and the timing control IC 13 of a detection result FAIL_DET1 about abnormality in the gate driver IC and abnormality in the source driver IC via an abnormality detection informing line L1. Note that, unlike this example, the abnormality detection informing line L1 may not be connected to the timing control IC 13, and the system power supply IC 12 may inform only the MPU 5 of the detection result FAIL_DET1 about abnormality in the gate driver IC and abnormality in the source driver IC via the abnormality detection informing line L1.

As illustrated in FIG. 8, the timing control IC 13 informs the MPU 5 of a detection result FAIL_DET2 about abnormality in the gate driver IC and abnormality in the source driver IC, via an abnormality detection informing line L2.

As illustrated in FIG. 8, the MPU 5, the system power supply IC 12, and the timing control IC 13 are connected to each other via a bus line L3 such as I2C or SPI, so that bidirectional communication can be performed.

In this example, the timing control IC 13 detects an abnormality in the source driver IC on the basis of a feedback signal from the source driver IC.

Figure 9:
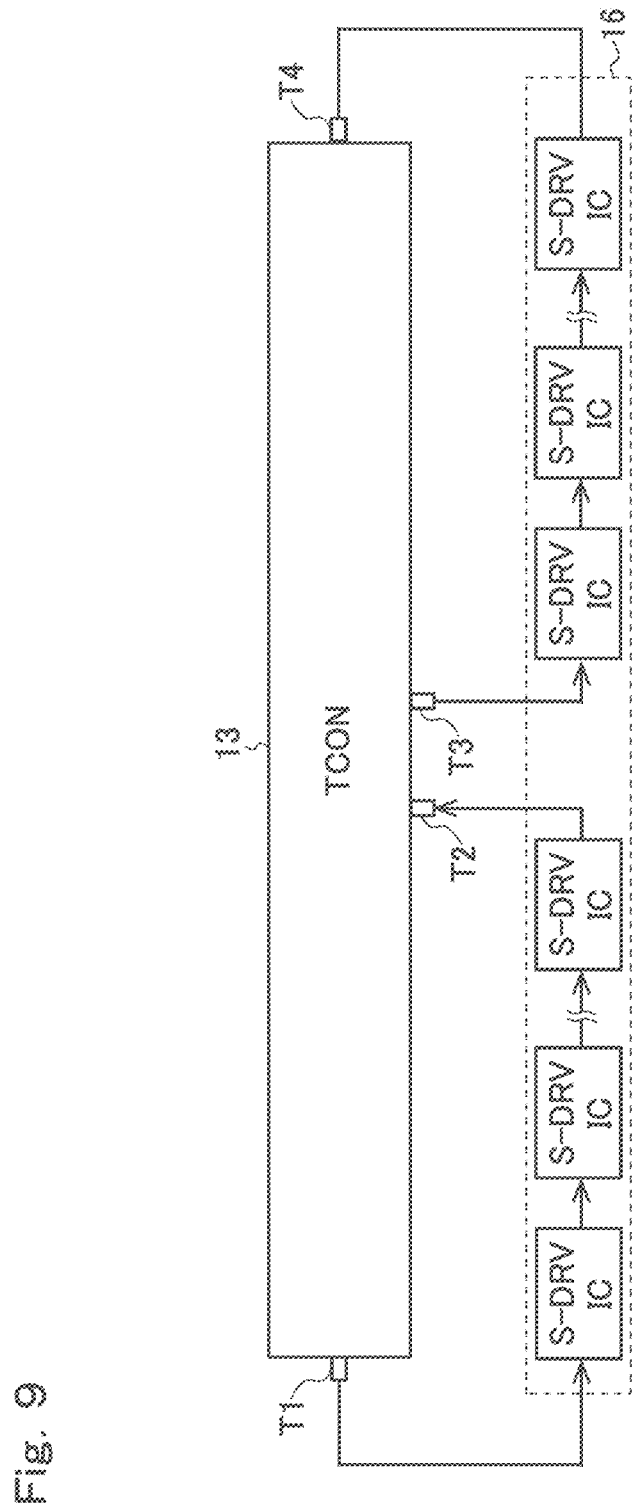
FIG. 9 is a block diagram illustrating a schematic connection relationship between the timing control IC and source driver ICs.

The source driver ICs corresponding to the left half region of the pixel array 11 are connected between a terminal T1 and a terminal T2 of the timing control IC 13, while the source driver ICs corresponding to the right half region of the pixel array 11 are connected between a terminal T3 and a terminal T4 of the timing control IC 13 (see FIG. 9). The timing control IC 13 outputs from the terminal T1 a pulse signal to be a write start trigger for the source driver ICs corresponding to the left half region of the pixel array 11. When the source driver ICs corresponding to the left half region of the pixel array 11 are normally written, the source driver unit 16 supplies the terminal T2 with the feedback signal in each frame of the image (one pulse signal in each frame). Further, the timing control IC 13 outputs from the terminal T3 a pulse signal to be a write start trigger for the source driver ICs corresponding to the right half region of the pixel array 11. When the source driver ICs corresponding to the right half region of the pixel array 11 are normally written, the source driver unit 16 supplies the terminal T4 with the feedback signal in each frame of the image (one pulse signal in each frame). Therefore, if the timing control IC 13 cannot detect a pulse edge in each frame of the image in the voltages applied to the terminals T2 and T4, the timing control IC 13 detects an abnormality in the source driver IC.

For instance, if the image signal does not reach the source driver IC, or if the output of the source driver IC is fixed to low level, or if the source driver IC is peeled from the substrate, or if the image signal is undefined, or if other abnormality occurs, data in an internal register of the source driver IC is not updated. This abnormality cannot be detected by the self-detection function of the source driver IC but can be detected by using the method described above.

Further, for example, if the image signal does not reach the source driver IC, or if the image signal is undefined, or if other abnormality occurs, the cause of the abnormality is considered to be a communication error between the timing control IC 13 and the source driver unit 16. However, the source driver unit 16 cannot determine whether a communication error has occurred between the timing control IC 13 and the source driver unit 16 or other abnormality has occurred.

Therefore, in this example, the timing control IC 13 detects an abnormality in the source driver IC on the basis of a voltage value of the control signal output to the source driver IC. For instance, if the voltage value of the control signal output to the source driver IC is 1.8 V or higher, or 0.25 V or lower, the timing control IC 13 should detect an abnormality in the source driver IC.

In this example, the timing control IC 13 detects an abnormality in the gate driver IC on the basis of a feedback signal from the gate driver IC.

A connection relationship between the timing control IC 13 and the gate driver IC is basically the same as the connection relationship between the timing control IC 13 and the source driver IC, except presence or absence of the level shifter 14. Therefore, if no pulse edge is detected in each frame of the image in the feedback signal supplied from the gate driver unit 15, the timing control IC 13 detects an abnormality in the gate driver IC.

For instance, if the gate driver IC is peeled from the substrate, or if the image signal is abnormal, or if other abnormality occurs, data in the internal register of the gate driver IC is not updated. This abnormality is hardly detected by the self-detection function of the gate driver IC, but can be easily detected by using the method described above.

In this example, the system power supply IC 13 determines whether or not the value of the analog power supply voltage AVDD is lower than an allowable lower limit value, and detects an abnormality in the source driver IC on the basis of a result of this determination. Specifically, if the value of the analog power supply voltage AVDD is lower than the allowable lower limit value, the system power supply IC 13 detects an abnormality in the source driver IC.

In this example, the system power supply IC 13 determines whether or not the logic power supply voltage VDD is lower than the allowable lower limit value, and detects an abnormality in the timing control IC 13 on the basis of a result of this determination. Specifically, if the logic power supply voltage VDD is lower than an allowable lower limit value, the system power supply IC 13 detects an abnormality in the timing control IC 13.

In this example, the system power supply IC 13 determines whether or not the positive power supply voltage VON is lower than the allowable lower limit value, and determines whether or not the negative voltage VOFF is higher than an allowable upper limit value, so as to detect an abnormality in the gate driver IC on the basis of results of these determination. Specifically, if the positive power supply voltage VON is lower than an allowable lower limit value, or if the negative voltage VOFF is higher than an allowable upper limit value, the system power supply IC 13 detects an abnormality in the gate driver IC.

Note that if the input voltage VIN becomes lower than a minimum operating voltage, the system power supply IC 13 stops outputting various types of power supply voltages. It is supposed that each of the detection result FAIL_DET1 and the FAIL_DET2 about an abnormality in the gate driver IC and an abnormality in the source driver IC is high level if no abnormality is detected, and it is low level if an abnormality is detected. Then, the determination results shown in FIG. 10 can be obtained, for example. Note that comprehensive determination in FIG. 10 is made by the MPU 5.

<5. Other Structural Example of Liquid Crystal Display Device>

Figure 11:
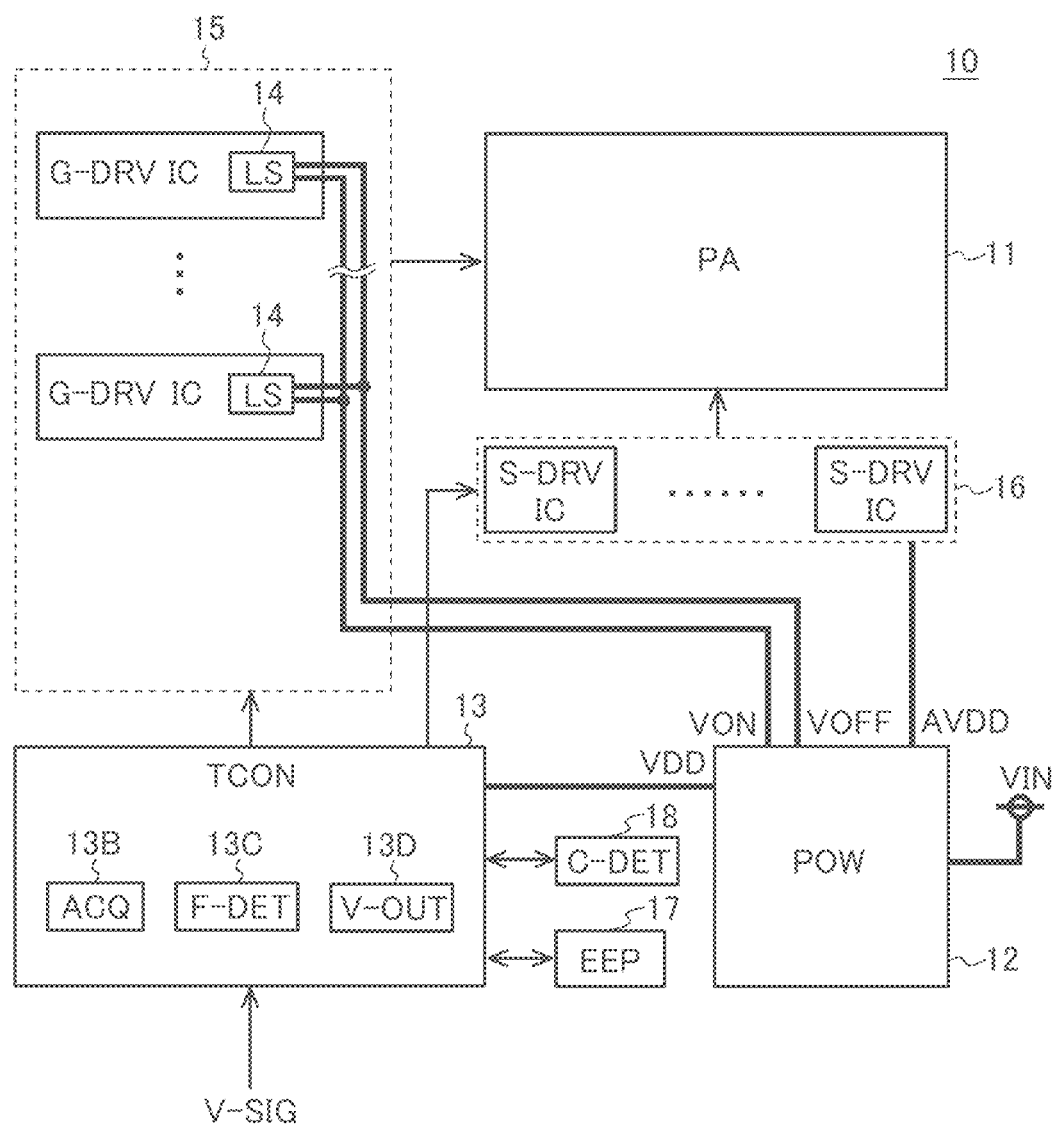
FIG. 11 is a block diagram illustrating a structural example of the liquid crystal display device other than the structure illustrated in FIG. 4.

FIG. 11 is a block diagram illustrating a structural example of the liquid crystal display device other than the structure of FIG. 4. Note that, in FIG. 11, the same part as in FIG. 4 is denoted by the same numeral or symbol. The liquid crystal display device 10 includes the pixel array 11, the system power supply IC 12, the timing control unit 13, the gate driver 15, the source driver 16, and the backlight (not shown). The gate driver 15 includes a plurality of gate driver ICs. Each of the gate driver ICs includes the level shifter 14 and the switch (not shown) on its output stage.

As illustrated in FIG. 5 described above, the pixel array 11 includes the plurality of pixel circuits 11A disposed in a plurality of rows and a plurality of columns, the plurality of gate lines GL disposed corresponding to the plurality of rows, and the plurality of source lines SL disposed corresponding to the plurality of columns. One end of each gate line GL is connected to the gate driver 15. One end of each source line SL is connected to the source driver 16.

The pixel circuit 11A includes the thin film transistor (TFT) 11B and the liquid crystal cell 11C. Note that, instead of the TFT of this example, another switch that can be turned on and off by a voltage applied to the gate line GL may be used. A gate of each TFT 11B is connected to the corresponding gate line GL. A source of each TFT 11B is connected to the corresponding source line SL. A drain of each TFT 11B is connected to a common line (not shown) to which a common voltage is applied via the corresponding liquid crystal cell 11C. The liquid crystal cell 11C includes two transparent electrodes opposed to each other, and liquid crystal filled between the two transparent electrodes.

When the gate line GL is low level, i.e. when the negative power supply voltage VOFF described later is applied to the gate line GL, the TFT 11B is off. On the contrary, when the gate line GL is high level, i.e. when the positive power supply voltage VON described later is applied to the gate line GL, the TFT 11B is on. When the TFT 11B is on, a voltage of the source line SL is written in a storage node N1 between the drain of the TFT 11B and the liquid crystal cell 11C, and the voltage written in the storage node N1 is sustained by the storage node N1 when the TFT 11B is switched from on to off. Light transmittance of the liquid crystal cell 11C changes depending on the voltage written in the storage node N1. If the pixel array 11 is a normally white type, the light transmittance of the liquid crystal cell 11C becomes maximum when the voltage written in the storage node N1 is equal to the above-mentioned common voltage. On the contrary, if the pixel array 11 is a normally black type, the light transmittance of the liquid crystal cell 11C becomes minimum when the voltage written in the storage node N1 is equal to the above-mentioned common voltage. In the following description, it is supposed that the pixel array 11 is a normally black type.

With reference to FIG. 11 again, the system power supply unit 12 operates when the input voltage VIN (e.g. +5 V) is supplied, generates the analog power supply voltage AVDD (e.g. +13 V), the logic power supply voltage VDD (e.g. +3.3 V, +1.8 V, or +1.2 V), the positive power supply voltage VON (e.g. +28 V), and the negative voltage VOFF (e.g. −12 V), and supplies the voltages to individual portions of the device.

The timing control unit 13 operates when the logic power supply voltage VDD is supplied, and controls operation timings of the gate driver 15 and the source driver 16 on the basis of the image signal V-SIG supplied from a graphics processing unit (GPU) (not shown), for example.

The level shifter 14 in the gate driver IC operates when the positive power supply voltage VON and the negative power supply voltage VOFF are supplied, and performs level shift of a control signal supplied from the timing control unit 13.

The plurality of gate driver ICs in the gate driver 15 sequentially selects the plurality of gate lines GL of the pixel array 11 one by one for a predetermined time each. The plurality of gate driver ICs in the gate driver 15 set the selected gate line GL to high level.

In this example, the gate driver 15 includes the plurality of gate driver ICs as described above. Each gate driver IC is assigned with the plurality of gate lines GL, and each gate line GL is connected to one of the gate driver ICs. Note that, unlike this embodiment, the gate driver 15 may be constituted of a single gate driver IC.

Further, in this example, the gate driver ICs are mounted on a glass substrate of the liquid crystal panel as chip on glass (COG). Note that, unlike this embodiment, the gate driver ICs may not be mounted on the glass substrate but may be mounted on a substrate (such as a printed wiring board) other than the glass substrate. Further, unlike this embodiment, it may be possible to use a panel type including a pixel array and a circuit portion corresponding to output stage switches of the gate driver ICs (a panel type called a gate in panel (GIP) or a gate on array (GOA)). If this panel type is used, only a circuit portion corresponding to the output stage switches out of the gate driver ICs is formed on the liquid crystal panel, and the level shifter 14 is disposed externally of the liquid crystal panel.

The source driver 16 writes a voltage of a level corresponding to the image signal V-SIG in the storage node N1 of each pixel circuit 11A corresponding to the gate line GL selected by the gate driver 15, via each source line SL.

In this example, the source driver 16 includes a plurality of source driver ICs. Each source driver IC is assigned with the plurality of source lines SL, and each source line SL is connected to one of the source driver ICs. Note that, unlike this embodiment, the source driver 16 may be constituted of a single source driver IC.

Further, in this example, the source driver ICs are mounted on the glass substrate of the liquid crystal panel as chip on glass (COG). Note that, unlike this embodiment, the source driver ICs may not be mounted on the glass substrate but may be mounted on a substrate (such as a printed wiring board) other than the glass substrate.

The backlight (not shown) illuminates the back surface of the pixel array 11. Light entering the back surface of the pixel array 11 goes out from the front surface of the pixel array 11, after intensity thereof is adjusted in each pixel of the pixel array 11 in accordance with the light transmittance of the liquid crystal cell 11C.

The liquid crystal display device 10 further includes the EEPROM 17 and a current detection unit 18. Further, the timing control unit 13 includes an obtaining unit 13B, a fault detection unit 13C, and a reference voltage output unit 13D. The reference voltage output unit 13D generates a reference voltage VR corresponding to a set value stored in the EEPROM 17 and outputs the reference voltage VR to the current detection unit 18. Note that, unlike this embodiment, instead of the EEPROM 17, a nonvolatile memory other than the EEPROM 17 may be used.

Figure 12:
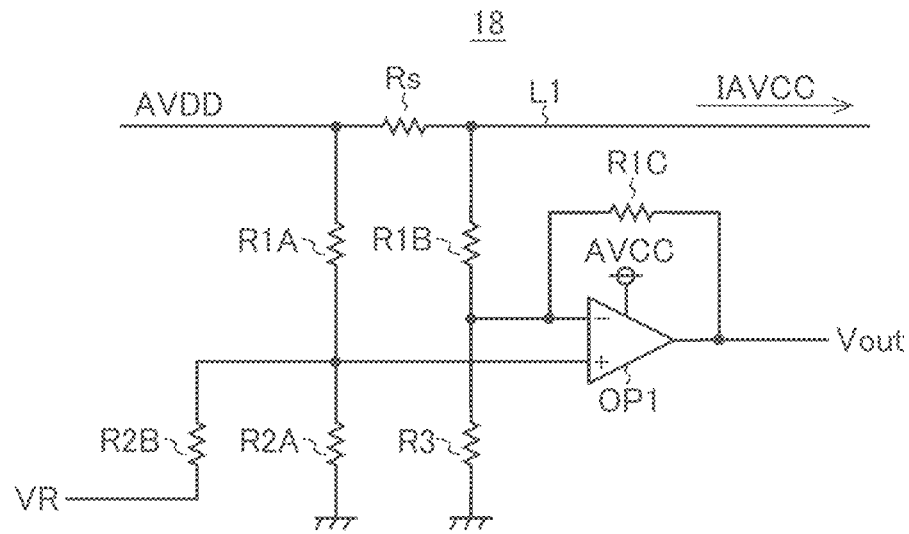
FIG. 12 is a diagram illustrating one structural example of a current detection unit.

The current detection unit 18 detects charging current and discharging current of the pixel array 11. As illustrated in FIG. 12, the current detection unit 18 includes a resistor Rs, resistors R1A, R2A, and R2B, resistors R1B and R3, an operational amplifier OP1, and a resistor R1C. The resistor Rs is disposed in a power supply line L1 that supplies the analog power supply voltage AVDD to the source driver 16. A first voltage divider circuit constituted of the resistors R1A, R2A, and R2B divides the voltage at one end of the resistor Rs. A second voltage divider circuit constituted of the resistor R1B and R3 divides the voltage at the other end of the resistor Rs.

An output terminal of the first voltage divider circuit is connected to a noninverting input terminal of the operational amplifier OP1. An output terminal of the second voltage divider circuit is connected to an inverting input terminal of the operational amplifier OP1. Further, the output terminal and the inverting input terminal of the operational amplifier OP1 are connected via the resistor R1C.

Resistance values of the resistors are set so as to satisfy the following equation (1). In this way, the output of the current detection unit 18, i.e. an output Vout of the operational amplifier OP1 satisfies the following equation (2). Here, rs represents a resistance value of the resistor Rs, r1 represents a resistance value of each of the resistors R1A and R1B, r2 represents a combined resistance value of the resistors R2A and R2B, r3 represents a resistance value of the resistor R3, and a resistance value of the resistor R1C is N×r1.

$$r2(N \times r1 + r3 + N \times r3)/(r3(r1+r2)) = N \quad (1)$$

$$Vout = N(rs \times IAVDD) \quad (2)$$

By providing the first voltage divider circuit and the second voltage divider circuit, the voltage applied to each input terminal of the operational amplifier OP1 can be decreased, and hence a low withstand voltage operational amplifier can be used as the operational amplifier OP1.

The resistance values of the resistors are varied due to product variations, and hence it is difficult in reality to satisfy the equation (1). Therefore, in the current detection unit 18 shown in FIG. 12, one end of the resistor R2B is applied with the reference voltage VR instead of the ground potential, and the reference voltage VR is adjusted within a range of 0 V to 3 V, so as to correct the voltage output from the first voltage divider circuit. The adjustment of the reference voltage VR is performed by the reference voltage output unit 13D of the timing control unit 13. In other words, the current detection unit 18 shown in FIG. 12 is configured to include a voltage correction circuit that corrects the voltage output from the first voltage divider circuit. The reference voltage output unit 13D of the timing control unit 13 and the voltage correction circuit of the current detection unit 18 correspond to a correction unit that corrects a detection variation of the current detection unit 18. This correction unit improves detection accuracy of the current detection unit 18.

Unlike this example, the current detection unit 18 may detect current flowing in the power supply line that supplies the power supply voltage for the gate driver IC, so as to detect the charging current and discharging current of the pixel array 11, or may detect current flowing in the power supply line that supplies the input voltage VIN to the system power supply IC 12, so as to detect the charging current and discharging current of the pixel array 11.

With reference to FIG. 11 again, the obtaining unit 13B performs A/D conversion of a detection result by the current detection unit 18 and obtains the same. The detection result by the current detection unit 18 obtained by the obtaining unit 13B at initial time (e.g. in an inspection before shipping from factory) is stored in the EEPROM 17.

The fault detection unit 13C detects a fault in the liquid crystal display device 10 on the basis of the detection result by the current detection unit 18 obtained by the obtaining unit 13B. More specifically, the fault detection unit 13C detects a fault in the liquid crystal display device 10 at non-initial time, on the basis of a comparison result between the detection result by the current detection unit 18 obtained by the obtaining unit 13B at the initial time and the detection result by the current detection unit 18 obtained by the obtaining unit 13B at the non-initial time (e.g. every time or every several times when the power supply to the liquid crystal display device 10 is turned on after shipping from factory).

Note that, during the period while the obtaining unit 13B is obtaining the detection result by the current detection unit 18 at the non-initial time, it is preferred that the timing control unit 13 should issue an instruction to a backlight drive control unit so as to disable the backlight, so that the backlight is turned off. In this way, during the period while the obtaining unit 13B is obtaining the detection result by the current detection unit 18 at the non-initial time, even if the liquid crystal display device 10 is displaying an image that has no relation with the image signal V-SIG, the image that has no relation with the image signal V-SIG becomes inconspicuous. Note that it may possible that the timing control unit 13 or the system power supply IC 12 controls drive of the backlight, so as to turn off the backlight during the period while the obtaining unit 13B is obtaining the detection result by the current detection unit 18 at the non-initial time.

Figure 13:
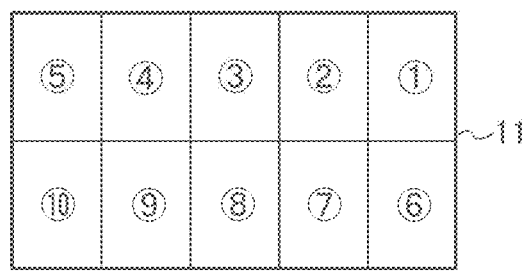
FIG. 13 is a diagram illustrating a division example of the pixel array.

In this example, the obtaining unit 13B divides the display region of the pixel array 11 into ten divided areas, as shown in FIG. 13. Either at the initial time or at the non-initial time, the obtaining unit 13B obtains the detection result by the current detection unit 18 when a display of only one divided area is changed in order of circled numbers shown in FIG. 13, for example.

Figure 14:
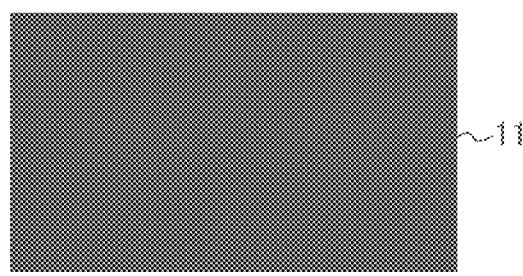
FIG. 14 is a diagram illustrating a display example of the pixel array.
Figure 15:
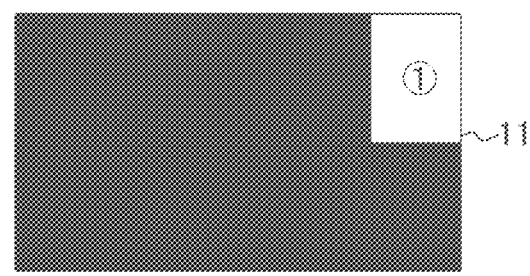
FIG. 15 is a diagram illustrating a display example of the pixel array.

For instance, first as shown in FIG. 14, the whole display region of the pixel array 11 is blackened (minimum light transmittance), and then as shown in FIG. 15, only the display region corresponding to circled number 1 of the pixel array 11 is whitened (maximum light transmittance), so that the obtaining unit 13B can obtain the charging current of the pixel array 11 (more specifically an integrated value of the charging current, the same is true in the following description) when a display of only the display region corresponding to circled number 1 is changed. By repeating the same procedure, the obtaining unit 13B can obtain the charging current of the pixel array 11 when a display of only the display region corresponding to each of circled numbers 2 to 10 is changed. This display sequence may be realized when the timing control unit 13 controls the gate driver 15 and the source driver 16, or the source driver IC itself of the source driver 16 may store a test mode operation sequence in a nonvolatile manner, and each source driver IC may execute the test mode operation sequence autonomously at the initial time (e.g. in an inspection before shipping from factory) and at the non-initial time (e.g. every time or every several times when the power supply to the liquid crystal display device 10 is turned on after shipping from factory). If each source driver IC executes the test mode operation sequence autonomously, the test mode operation sequence can be started before startup of the timing control unit 13 is completed, and hence time necessary for fault detection can be deceased. Note that, at the initial time, the EEPROM 17 stores the charging current of the pixel array 11 when a display of only the display region corresponding to each of circled numbers 1 to 10 is changed.

Note that, unlike this example, it may be possible that, at the initial time, first the whole display region of the pixel array 11 is blackened (minimum light transmittance), and then the whole display region of the pixel array 11 is whitened, so that the obtaining unit 13B can obtain the charging current of the pixel array 11 when a display of the whole display region is changed. In this case, the EEPROM 17 stores the charging current of the pixel array 11 when a display of the whole display region is changed at the initial time. Further, in the comparison by the fault detection unit 13C between the initial time and the non-initial time, it is preferred to use a value of one tenth of the charging current of the pixel array 11 when a display of the whole display region is changed at the initial time. Note that if the divided areas do not have the same number of pixels, it is preferred to use values obtained by dividing the charging current of the pixel array 11 when a display of the whole display region is changed at the initial time in accordance with a ratio of the number of pixels. Note that the variation described above is predicted that the pixel circuits 11B have no characteristic variation in the pixel array 11, and hence the example in which the charging current of the pixel array 11 when a display of only the display region corresponding to each of circled numbers 1 to 10 is changed at the initial time is actually detected is preferred more than the example described above.

Further, unlike this example, the divided areas may not constitute a single block. For instance, it may be possible to set the first divided area as the pixel circuits 11A disposed on the gate lines GL of odd numbers and on the source lines SL of odd numbers, the second divided area as the pixel circuits 11A disposed on the gate lines GL of even numbers and on the source lines SL of odd numbers, the third divided area as the pixel circuits 11A disposed on the gate lines GL of odd numbers and on the source lines SL of even numbers, and the fourth divided area as the pixel circuits 11A disposed on the gate lines GL of even numbers and on the source lines SL of even numbers.

Note that, in view of easy display control for changing a display of only one divided area, it is preferred that the divided areas are formed by a unit of the source driver IC.

In this example, the fault detection unit 13C detects a fault in the liquid crystal display device 10 for each divided area, and hence fault detection becomes easy. For instance, it is supposed that a fault in the liquid crystal display device 10 causes a decrease in a capacitive load of the display region corresponding to circled number 1 by 3% of a capacitive load of the whole pixel array 11 compared with that at the initial time. In this supposition, if a display of the whole display region of the pixel array 11 is changed, the charging current of the pixel array 11 is decreased by only 3% from that at the initial time. In contrast, in this supposition, if a display of only the display region corresponding to circled number 1 is changed, the charging current of the pixel array 11 is decreased by as much as 30% from that at the initial time. Therefore, when the fault detection unit 13C detects a fault in the liquid crystal display device 10 for each divided area, it is possible to detect a small fault (with a small variation in the capacitive load due to the fault) in the liquid crystal display device 10.

If an absolute value of a difference between the charging current of the pixel array 11 at the non-initial time and the charging current of the pixel array 11 at the initial time is a first predetermined value or larger, the fault detection unit 13C determines that a fault has occurred in the liquid crystal display device 10, which may be a physical breakdown of the pixel array 11 (e.g. a fracture or a defect) in the divided area for which the comparison between the initial time and the non-initial time is being performed. The reason for this determination is that the charging current is changed due to the physical breakdown of the pixel array 11. Note that the first predetermined value is preferably stored in the EEPROM 17, for example. Further, the first predetermined value may be divided into a first predetermined value for open-circuit breakdown detection and a first predetermined value for short-circuit breakdown detection. If a value obtained by subtracting the charging current of the pixel array 11 at the non-initial time from the charging current of the pixel array 11 at the initial time is larger than or equal to the first predetermined value for open-circuit breakdown detection, it may be determined that an open-circuit breakdown has occurred. If a value obtained by subtracting the charging current of the pixel array 11 at the initial time from the charging current of the pixel array 11 at the non-initial time is larger than or equal to the first predetermined value for short-circuit breakdown detection, it may be determined that a short-circuit breakdown has occurred. Each of the first predetermined value for open-circuit breakdown detection and the first predetermined value for short-circuit breakdown detection is a positive value. The first predetermined value for open-circuit breakdown detection and the first predetermined value for short-circuit breakdown detection may be different values, or may be the same value.

Further, if an absolute value of a difference between the charging current of the pixel array 11 at the non-initial time and the charging current of the pixel array 11 at the initial time is a second predetermined value or larger, the fault detection unit 13C determines that a fault has occurred in the liquid crystal display device 10, which may be an abnormality in the source driver IC (such as partial peeling from the substrate, detachment from the substrate, or break of the IC itself) in the divided area for which the comparison between the initial time and the non-initial time is being performed. The reason for this determination is that the charging current is changed due to the abnormality in the source driver IC. Note that the second predetermined value is preferably stored in the EEPROM 17, for example. Further, the second predetermined value may be divided into a second predetermined value for open-circuit breakdown detection and a second predetermined value for short-circuit breakdown detection. If a value obtained by subtracting the charging current of the pixel array 11 at the non-initial time from the charging current of the pixel array 11 at the initial time is larger than or equal to the second predetermined value for open-circuit breakdown detection, it may be determined that an open-circuit breakdown has occurred. If a value obtained by subtracting the charging current of the pixel array 11 at the initial time from the charging current of the pixel array 11 at the non-initial time is larger than or equal to the second predetermined value for short-circuit breakdown detection, it may be determined that a short-circuit breakdown has occurred. Each of the second predetermined value for open-circuit breakdown detection and the second predetermined value for short-circuit breakdown detection is a positive value. The second predetermined value for open-circuit breakdown detection and the second predetermined value for short-circuit breakdown detection may be different values, or may be the same value.

Further, if an absolute value of a difference between the charging current of the pixel array 11 at the non-initial time and the charging current of the pixel array 11 at the initial time is a third predetermined value or larger, the fault detection unit 13C determines that a fault has occurred in the liquid crystal display device 10, which may be an abnormality in the gate driver IC (such as partial peeling from the substrate, detachment from the substrate, or break of the IC itself) in the divided area for which the comparison between the initial time and the non-initial time is being performed. The reason for this determination is that the gate of the TFT 11B becomes undefined due to the abnormality in the gate driver IC, and an expected display change does not occur when only a display of the divided area is changed, and the charging current of the pixel array 11 when only a display of the divided area is changed is considered to change with respect to normal time. Note that the third predetermined value is preferably stored in the EEPROM 17, for example. Further, the third predetermined value may be divided into a third predetermined value for open-circuit breakdown detection and a third predetermined value for short-circuit breakdown detection. If a value obtained by subtracting the charging current of the pixel array 11 at the non-initial time from the charging current of the pixel array 11 at the initial time is larger than or equal to the third predetermined value for open-circuit breakdown detection, it may be determined that an open-circuit breakdown has occurred. If a value obtained by subtracting the charging current of the pixel array 11 at the initial time from the charging current of the pixel array 11 at the non-initial time is larger than or equal to the third predetermined value for short-circuit breakdown detection, it may be determined that a short-circuit breakdown has occurred. Each of the third predetermined value for open-circuit breakdown detection and the third predetermined value for short-circuit breakdown detection is a positive value. The third predetermined value for open-circuit breakdown detection and the third predetermined value for short-circuit breakdown detection may be different values, or may be the same value.

Further, if the divided areas in each of which a fault is detected are arranged in a column direction without lacking, the fault detection unit 13C may determine that an abnormality in the source driver IC or a physical breakdown of the pixel array 11 has occurred. Further, if the divided areas in each of which a fault is detected are arranged in a row direction without lacking, the fault detection unit 13C may determine that an abnormality in the gate driver IC or a physical breakdown of the pixel array 11 has occurred. Further, in a case other than the above cases, the fault detection unit 13C may determine that a physical breakdown of the pixel array 11 has occurred.

Figure 1:
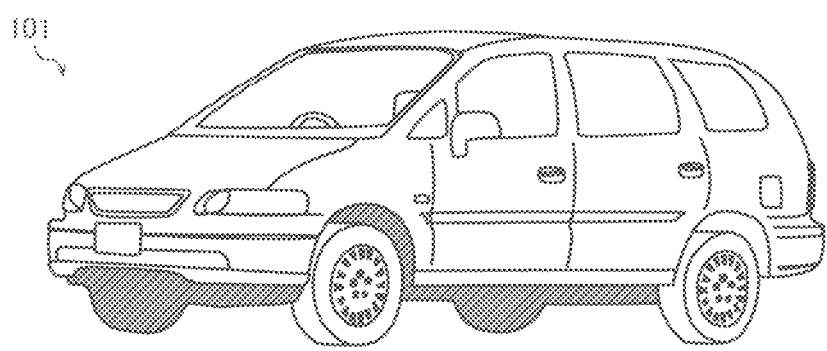
FIG. 1 is an external view of a vehicle.
Figure 2:
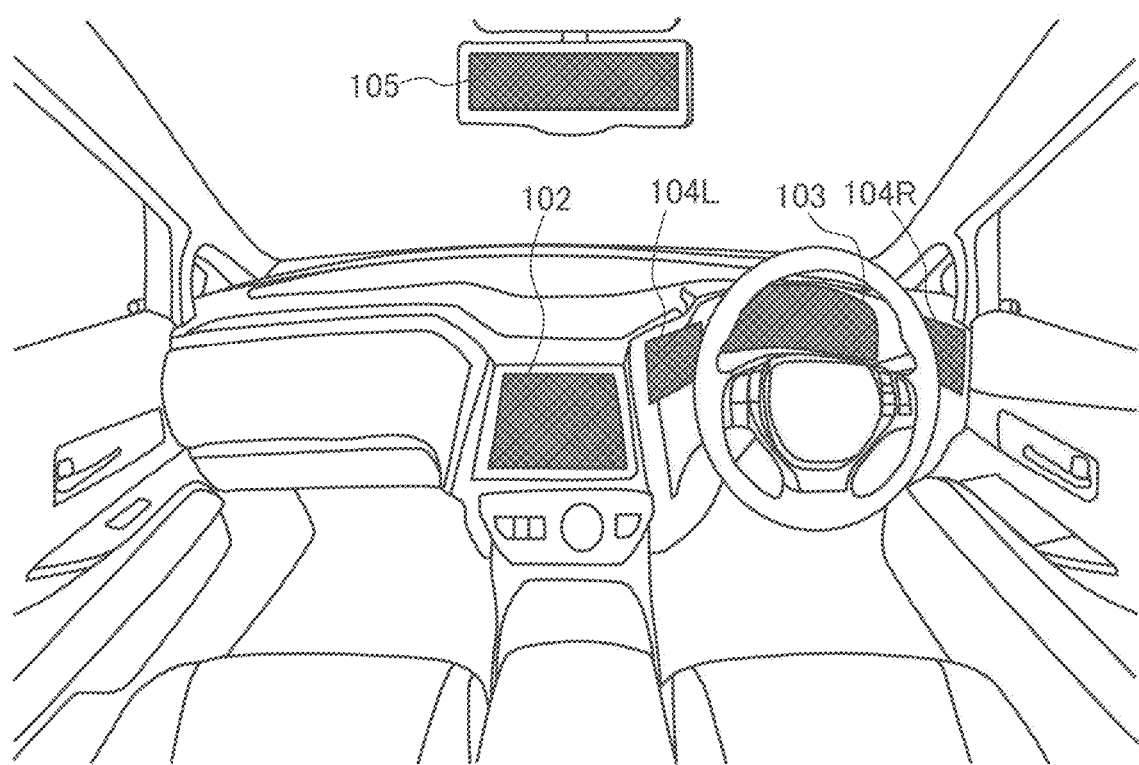
FIG. 2 is a diagram illustrating an interior of the vehicle.

The liquid crystal display device 10 is mounted in the vehicle 101 shown in FIG. 1 described above, for example. When the liquid crystal display device 10 is mounted in the vehicle 101 shown in FIG. 1, it is preferably used as at least one of the center information display (CID) 102 that displays a map for a navigation system, for example, the instrument cluster 103, the display devices 104L and 104R of the electronic side mirror system, the display device 105 of the electronic rear-view mirror system, and the like (see FIG. 2 described above). Note that the instrument cluster 103 may be constituted of a single liquid crystal display device that performs display for a plurality of measuring instruments, or may be constituted of a plurality of liquid crystal display devices, each of which performs display for at least one measuring instrument.

<6. Pin Assignment of Timing Control IC>

Figure 16:
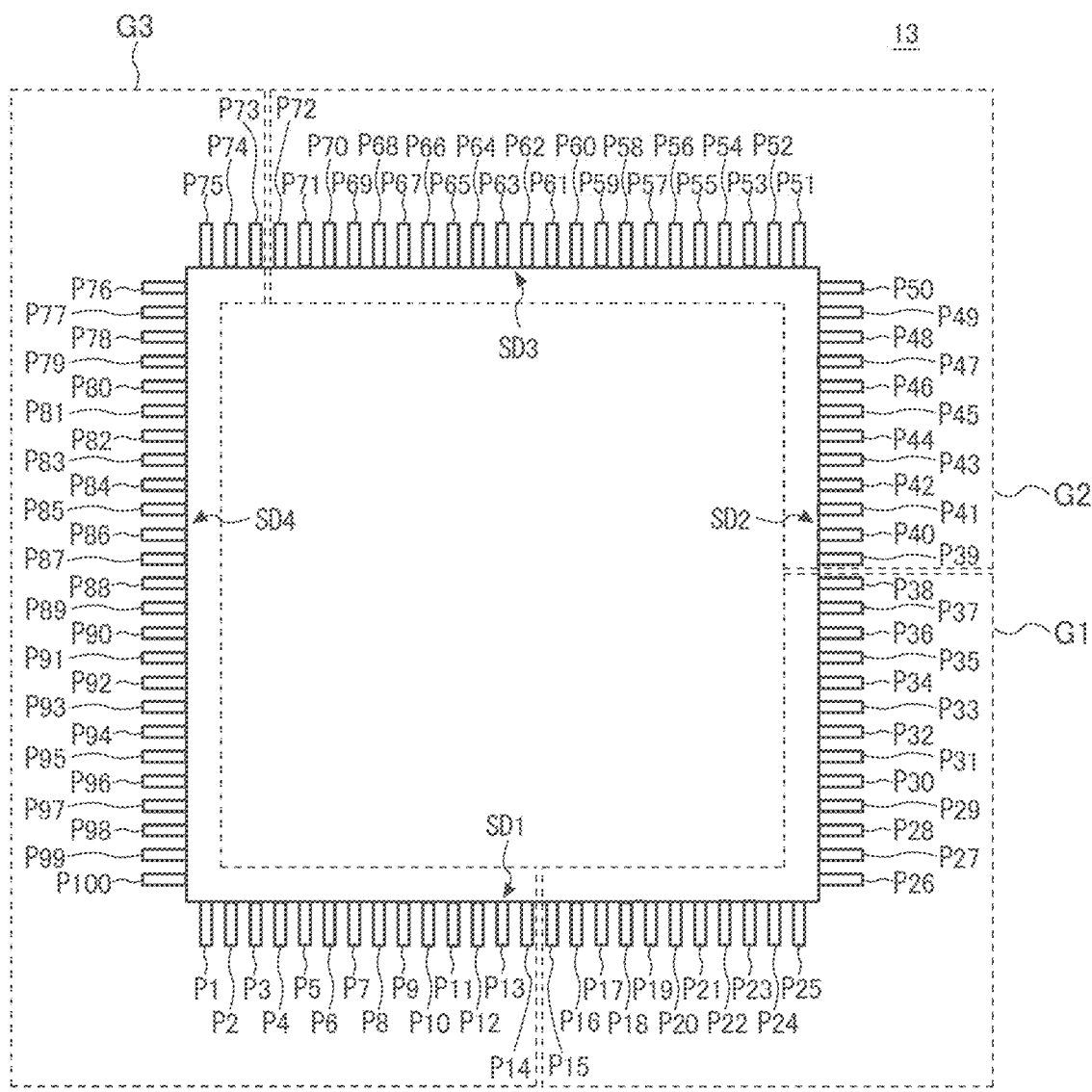
FIG. 16 is a plan view of the timing control IC.

The timing control IC 13 has a plurality of pins as means for establishing electric connection with outside of the device. For instance, as illustrated in FIG. 16, the timing control IC 13 is a substantially rectangular semiconductor package in a plan view, and 25 pins are arranged on each of a first side SD1 to a fourth side SD4 of a substantially rectangular shape. Pin P1 to Pin P25 are arranged on the first side SD1, and Pin P51 to Pin P75 are arranged on the third side SD3 opposed to the first side SD1. Pin P26 to Pin P50 are arranged on the second side SD2 neighboring the first side SD1 and the third side SD3, and Pin P76 to Pin P100 are arranged on the fourth side SD4 opposed to the second side SD2.

Note that the number of pins arranged on each of the first side SD1 to the fourth side SD4 of the substantially rectangular shape is not limited to this example. Further, the same number of pins are arranged on each side in this embodiment, but different numbers of pins may be arranged on the four sides, or only two or three sides out of four sides may have the same number of pins. Further, the substantially rectangular shape is a substantially square shape in this embodiment, but the substantially rectangular shape may be a substantially oblong rectangular shape.

At least some of the plurality of pins that receive input data (the image signal V-SIG in FIG. 4) supplied from the GPU (not shown) are arranged on the first side SD1, and at least some of the plurality of pins that supply output data to the gate driver ICs of the gate driver 15 and the source driver ICs of the source driver 16 (see FIG. 4) are arranged on the third side SD3.

Figure 17:
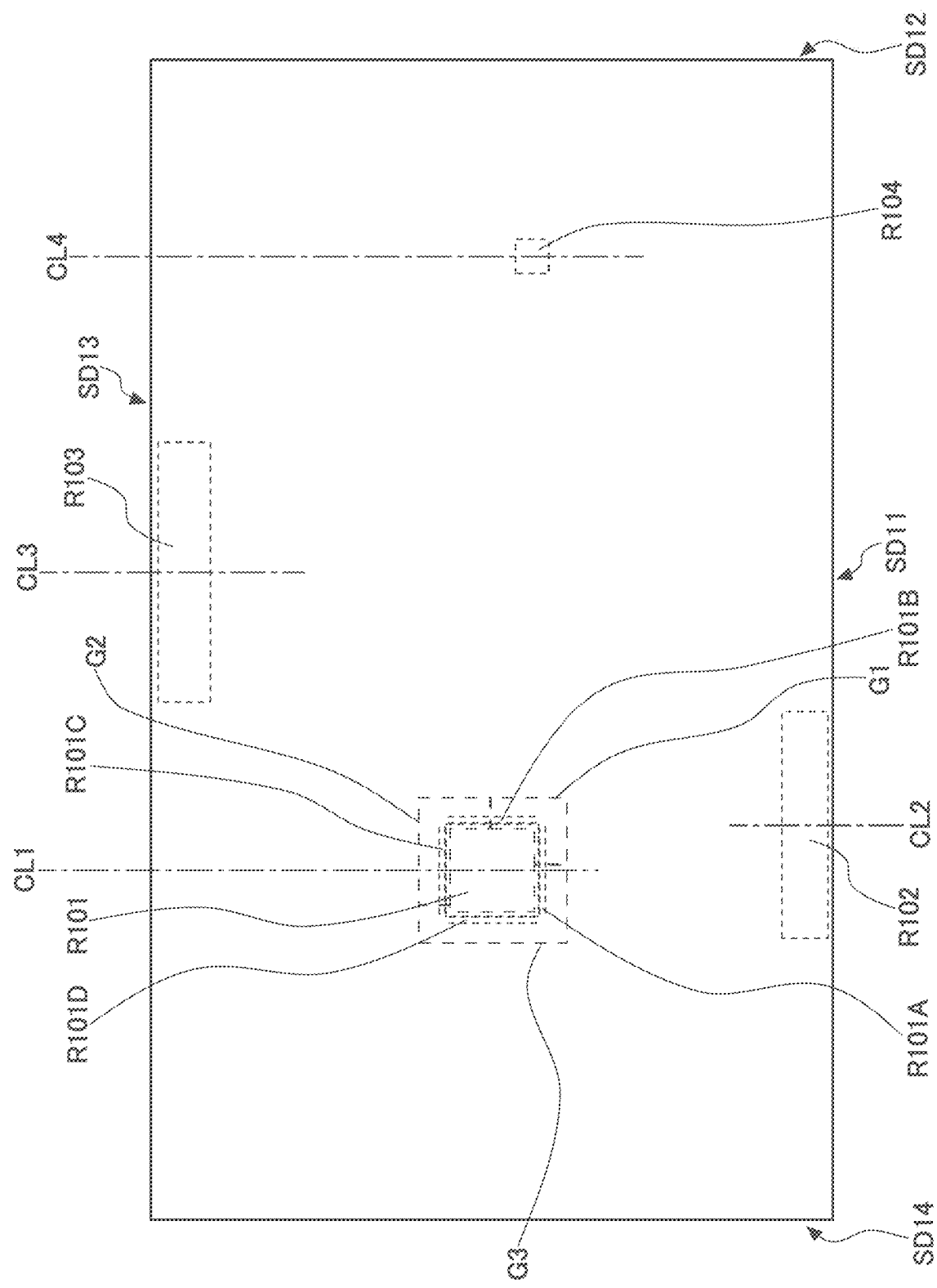
FIG. 17 is a plan view of a substrate indicating a mounting region of mounting components.
Figure 18:
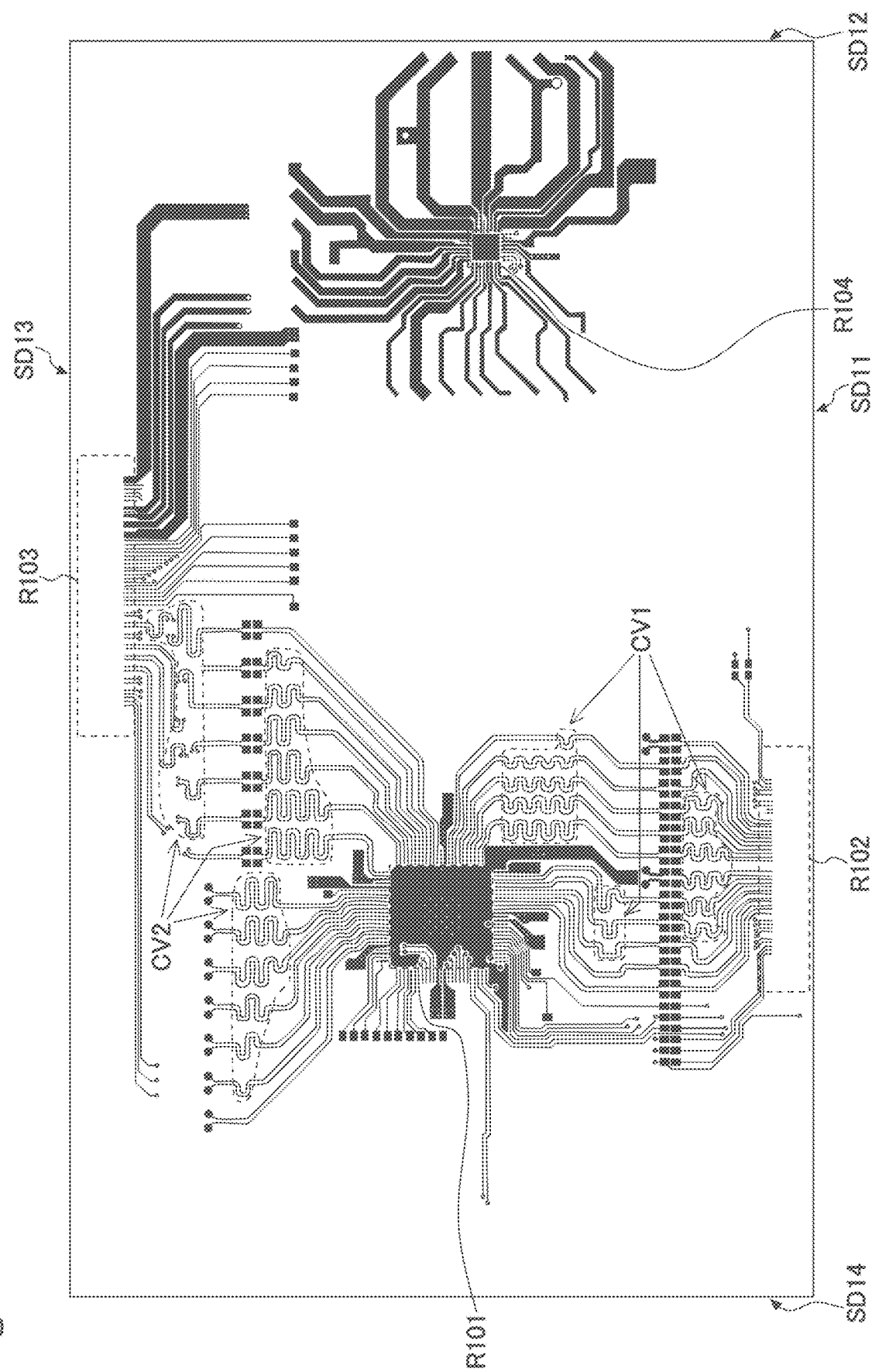
FIG. 18 is a plan view indicating a schematic shape of a metal layer disposed uppermost of the substrate.

In this way, when mounting the timing control IC 13 on the substrate illustrated in FIGS. 17 and 18, for example, the following (i) to (iv) are arranged in order, and hence print wiring can be easily designed.

(i) a connector connected to an end of a cable that sends input data supplied from the GPU (not shown)
(ii) at least some of the plurality of pins that receive the input data supplied from the GPU (not shown)
(iii) at least some of the plurality of pins that supply output data to the gate driver ICs of the gate driver 15 and the source driver ICs of the source driver 16

(iv) a connector connected to an end of a cable that supply output data to the gate driver ICs of the gate driver 15 and the source driver ICs of the source driver 16

Note that the substrate illustrated in FIGS. 17 and 18 is a substantially rectangular substrate in a plan view having a first side SD11 to a fourth side SD14. In FIG. 18, a black solid part indicates a metal layer (metal pattern). The substrate illustrated in FIGS. 17 and 18 have a region R101 in which a part of the timing control IC 13 except pins is mounted. The substrate illustrated in FIGS. 17 and 18 further has a region R101A in which Pin P1 to Pin P25 of the timing control IC 13 are mounted, a region R101B in which Pin P26 to Pin P50 of the timing control IC 13 are mounted, a region R101C in which Pin P51 to Pin P75 of the timing control IC 13 are mounted, and a region R101D in which Pin P76 to Pin P100 of the timing control IC 13 are mounted. The regions R101A to R101D are classified into a first group G1 in which Pin P15 to Pin P38 are mounted, a second group G2 in which Pin P39 to Pin P72 are mounted, a third group G3 in which Pin P1 to Pin P14, and Pin P73 to Pin P100 are mounted. As illustrated in FIG. 17, the region R101 is surrounded by the regions R101A to R101D. The substrate illustrated in FIGS. 17 and 18 further includes a region R102 in which a connector is mounted, which is connected to an end of a cable that sends the input data supplied from the GPU (not shown), and a region R103 in which a connector is mounted, which is connected to an end of a cable that supplies the output data to the gate driver ICs of the gate driver 15 and the source driver ICs of the source driver 16. Note that symbols R101 to R104 in FIG. 18 indicate regions obtained by projecting the region R101 to R104 in the normal direction of the substrate. The substrate illustrated in FIGS. 17 and 18 is designed so that wirings that send the input data from the connector mounted in the region R102 to the timing control IC 13 have the same length. In this example, a wiring bending section CV1 is disposed as shown in FIG. 18, and hence the wirings that send the input data from the connector mounted in the region R102 to the timing control IC 13 have the same length. Further, the substrate illustrated in FIGS. 17 and 18 is designed so that wirings that send the output data from the timing control IC 13 to the connector mounted in the region R103 have the same length. In this example, a wiring bending section CV2 is disposed as shown in FIG. 18, and hence the wirings that send the output data from the timing control IC 13 to the connector mounted in the region R103 have the same length. The substrate illustrated in FIGS. 17 and 18 further includes a region R104 in which the system power supply IC 12 is mounted, which is a substantially rectangular semiconductor package in a plan view. The regions R101, R101A, R101C, R102, and R103 are arranged in order of the region R102, the region R101, the region R101C, and the region R103 from the first side SD11 to the third side SD13 in a direction parallel to the second side SD12 and the fourth side SD14. In the direction parallel to the second side SD12 and fourth side SD14, the regions R101, R101A, and R101C are opposed to the region R102. In contrast, in the direction parallel to the second side SD12 and fourth side SD14, the region R103 is not opposed to any one of the regions R101, R101A, R101C, and R102. In the direction parallel to the second side SD12 and fourth side SD14, the region R104 is not opposed to any one of the regions R101, R101A, R101C, R102, and R103. A center line CL1 of the region R101 perpendicular to the direction parallel to the second side SD12 and fourth side SD14 is closer to the fourth side SD14 than a center line CL2 of the region R102 perpendicular to the direction parallel to the second side SD12 and fourth side SD14. The center line CL2 of the region R102 perpendicular to the direction parallel to the second side SD12 and fourth side SD14 is closer to the fourth side SD14 than a center line CL3 of the region R103 perpendicular to the direction parallel to the second side SD12 and fourth side SD14. The center line CL3 of the region R103 perpendicular to the direction parallel to the second side SD12 and fourth side SD14 is closer to the fourth side SD14 than a center line CL4 of the region R104 perpendicular to the direction parallel to the second side SD12 and fourth side SD14. In a direction parallel to the first side SD11 and the third side SD13, the region R104 is opposed to the regions R101, R101B, and R101D. In contrast, in the direction parallel to the first side SD11 and the third side SD13, each of the regions R102 and R103 is not opposed to any one of the regions R101, R101B, R101D, and R104.

In this example, Pin P15 to Pin P24, and Pin P27 to Pin P36 are the plurality of pins that receive the input data supplied from the GPU (not shown). In other words, the plurality of pins that receive the input data supplied from the GPU (not shown) are disposed on the first side SD1 and the second side SD2. In this way, it is also possible to support a case where an arrangement area of the plurality of pins that receive the input data supplied from the GPU (not shown) does not fit only in the first side SD1. Note that if the arrangement area of the plurality of pins that receive the input data supplied from the GPU (not shown) fits only in the first side SD1, all the plurality of pins that receive the input data supplied from the GPU (not shown) may be arranged on the first side SD1.

Further, as shown in this embodiment, it is preferred that the pins disposed on the first side SD1 so as to receive the input data supplied from the GPU (not shown) should be disposed close to the second side SD2 on the first side SD1, while the pins disposed on the second side SD2 so as to receive the input data supplied from the GPU (not shown) should be disposed close to the first side SD1 on the second side SD2. In this way, the arrangement area of the pins that receive input data supplied from the GPU (not shown) can be compact.

The number of pins disposed on the first side SD1 so as to receive the input data supplied from the GPU (not shown) is preferably equal to or larger than the number of pins disposed on the second side SD2 so as to receive the input data supplied from the GPU (not shown). In this way, the arrangement in order of (i) to (iv) as described above has a large significance.

In this example, Pin P39 to Pin P52, Pin P56 to Pin P72 are the plurality of pins that supply the output data to the gate driver ICs of the gate driver 15 and the source driver ICs of the source driver 16. In other words, the plurality of pins that supply the output data to the gate driver ICs of the gate driver 15 and the source driver ICs of the source driver 16 are disposed on the third side SD3 and the second side SD2. In this way, it is also possible to support a case where the arrangement area of the plurality of pins that supply the output data to the gate driver ICs of the gate driver 15 and the source driver ICs of the source driver 16 does not fit only in the third side SD3. Note that if the arrangement area of the plurality of pins that supply the output data to the gate driver ICs of the gate driver 15 and the source driver ICs of the source driver 16 fits only in the third side SD3, all the plurality of pins that supply the output data to the gate driver ICs of the gate driver 15 and the source driver ICs of the source driver 16 may be arranged on the third side SD3.

Further, as shown in this embodiment, it is preferred that the pins disposed on the third side SD3 so as to supply the output data to the gate driver ICs of the gate driver 15 and the source driver ICs of the source driver 16 should be disposed close to the second side SD2 on the third side SD3, while the pins disposed on the second side SD2 so as to supply the output data to the gate driver ICs of the gate driver 15 and the source driver ICs of the source driver 16 should be disposed close to the third side SD3 on the second side SD2. In this way, the arrangement area of the plurality of pins that supply the output data to the gate driver ICs of the gate driver 15 and the source driver ICs of the source driver 16 can be compact.

The number of pins disposed on the third side SD3 so as to supply the output data to the gate driver ICs of the gate driver 15 and the source driver ICs of the source driver 16 is preferably equal to or larger than the number of pins disposed on the second side SD2 so as to supply the output data to the gate driver ICs of the gate driver 15 and the source driver ICs of the source driver 16. In this way, the arrangement in order of (i) to (iv) as described above has a large significance.

A pin that outputs the detection result FAIL_DET2 (see FIG. 8) about an abnormality in the gate driver IC and an abnormality in the source driver IC and a pin that receives the detection result FAIL_DET1 (see FIG. 8) about an abnormality in the gate driver IC and an abnormality in the source driver IC supplied from the system power supply IC 12 are disposed on different sides out of the first side SD1 to the fourth side SD4. In this example, Pin P9 is the pin that outputs the detection result FAIL_DET2, and Pin P100 is the pin that receives the detection result FAIL_DET1. Note that, unlike this embodiment, the pin that outputs the detection result FAIL_DET2 and the pin that receives the detection result FAIL_DET1 may be disposed on the same side out of the first side SD1 to the fourth side SD4.

Note that in the case where at least either the pin that receives the input data supplied from the GPU (not shown) or the pin that supplies the output data to the gate driver ICs of the gate driver 15 and the source driver ICs of the source driver 16 is disposed on the second side SD2, it is preferred that at least either the pin that outputs the detection result FAIL_DET2 or the pin that receives the detection result FAIL_DET1 should be disposed on the fourth side SD4. It is because the fourth side SD4 out of the first side SD1 to the fourth side SD4 has highest flexibility of pin function assignment.

In this example, the pin that outputs the first pulse signal to be a write start trigger for the source driver IC (corresponding to the terminal T1 shown in FIG. 9) is disposed adjacent to the pin that receives a feedback signal in each frame of the image (one second pulse signal in each frame) when writing in the source driver IC, which starts by the first pulse signal as a trigger, is normally performed (corresponding to the terminal T2 shown in FIG. 9). In this way, inside the timing control IC 13, the circuit related to the first pulse signal and the second pulse signal can be compact to be disposed.

The first pulse signal is a pulse signal to be a write start trigger for the source driver ICs corresponding to the left half region of the pixel array 11. In this embodiment, Pin P73 is the pin that outputs the first pulse signal, and Pin P74 is the pin that receives the second pulse signal.

In this example, the pin that outputs the first pulse signal to be a write start trigger for the source driver IC (corresponding to the terminal T1 shown in FIG. 9) is disposed adjacent to the pin that receives a feedback signal in each frame of the image (one second pulse signal in each frame) when writing in the source driver IC, which starts by the first pulse signal as a trigger, is normally performed (corresponding to the terminal T2 shown in FIG. 9). In this way, inside the timing control IC 13, the circuit related to the first pulse signal and the second pulse signal can be compact to be disposed.

Further, in this example, the pin that outputs a third pulse signal to be a write start trigger for the source driver IC (corresponding to the terminal T3 shown in FIG. 9) is disposed adjacent to the pin that receives a feedback signal in each frame of the image (one fourth pulse signal in each frame) when writing in the source driver IC, which starts by the third pulse signal as a trigger, is normally performed (corresponding to the terminal T4 shown in FIG. 9). In this way, inside the timing control IC 13, the circuit related to the third pulse signal and the fourth pulse signal can be compact to be disposed.

The third pulse signal is a pulse signal to be a write start trigger for the source driver ICs corresponding to the right half region of the pixel array 11. In this embodiment, Pin P75 is the pin that outputs the third pulse signal, and Pin P76 is the pin that receives the fourth pulse signal.

In this example, the pin that outputs the third pulse signal to be a write start trigger for the source driver IC (corresponding to the terminal T3 shown in FIG. 9) is disposed adjacent to the pin that receives a feedback signal in each frame of the image (one fourth pulse signal in each frame) when writing in the source driver IC, which starts by the third pulse signal as a trigger, is normally performed (corresponding to the terminal T4 shown in FIG. 9). In this way, inside the timing control IC 13, the circuit related to the third pulse signal and the fourth pulse signal can be compact to be disposed.

In this example, the pin that outputs the first pulse signal and the pin that receives the second pulse signal are disposed close to a corner of the substantially rectangular shape, which is an end of the third side SD3 and an end of the fourth side SD4. In this way, the pin that supplies the output data to the gate driver 15 and the source driver 16 can be easily disposed on the third side SD3. Similarly, in this example, the pin that outputs the third pulse signal and the pin that receives the fourth pulse signal are disposed close to a corner of the substantially rectangular shape, which is an end of the third side SD3 and an end of the fourth side SD4. In this way, the pin that supplies the output data to the gate driver 15 and the source driver 16 can be easily disposed on the third side SD3.

Note that, unlike this example, it is possible, for example, to set Pin P73 and P74 to an open state, and the third pulse signal may be set as a pulse signal to be a write start trigger for the source driver IC corresponding to all areas of the pixel array 11.

Further, unlike this example, other pin may be disposed between the pin that outputs the first pulse signal and the pin that receives the second pulse signal, for example. In this way, the source driver IC connected between the pin that outputs the first pulse signal and the pin that receives the second pulse signal of the timing control IC 13 can be easily connected to the timing control IC 13. Similarly, unlike this example, other pin may be disposed between the pin that outputs the third pulse signal and the pin that receives the fourth pulse signal, for example. In this way, the source driver IC connected between the pin that outputs the third pulse signal and the pin that receives the fourth pulse signal of the timing control IC 13 can be easily connected to the timing control IC 13.

In this example, the pin that outputs the fifth pulse signal to be a write start trigger for the gate driver IC is disposed adjacent to the pin that receives a feedback signal in each frame of the image (one sixth pulse signal in each frame) when writing in the gate driver IC, which starts by the fifth pulse signal as trigger, is normally performed. In this way, inside the timing control IC 13, the circuit related to the fifth pulse signal and the sixth pulse signal can be compact to be disposed.

In this embodiment, Pin P86 is the pin that outputs the fifth pulse signal, and Pin P85 is the pin that receives the sixth pulse signal.

Note that, unlike this example, other pin may be disposed between the pin that outputs the fifth pulse signal and the pin that receives the sixth pulse signal, for example. In this way, the gate driver IC connected between the pin that outputs the fifth pulse signal and the pin that receives the sixth pulse signal of the timing control IC 13 can be easily connected to the timing control IC 13.

In this embodiment, Pin P1 to Pin P100 are classified into the first to third groups G1 to G3.

Pin P15 to Pin P38 are classified into the first group G1. The first group G1 mainly includes the pins that receive the input data supplied from the GPU (not shown). As described above, Pin P15 to Pin P24 and P27 to Pin P36 are the pins that receive the input data supplied from the GPU (not shown). Note that each of Pin P25, Pin P26, Pin P37, and Pin P38 is a pin applied with a predetermined voltage or a pin connected to the ground potential. Pin P15 to Pin P38 classified into the first group G1 are arranged on two sides. Specifically, Pin P15 to Pin P38 classified in the first group G1 are arranged on the first side SD1 and the second side SD2.

Pin P39 to Pin P72 are classified into the second group G2. The second group G2 mainly includes the pins that supply the output data to the gate driver ICs of the gate driver 15 and the source driver ICs of the source driver 16. As described above, Pin P39 to Pin P52 and P56 to Pin P72 are the pins that supply the output data to the gate driver ICs of the gate driver 15 and the source driver ICs of the source driver 16. Note that each of Pin P53, Pin P54, and Pin P55 is a pin applied with a predetermined voltage or a pin connected to the ground potential. Pin P39 to Pin P72 classified to the second group G2 are arranged on two sides. Specifically, Pin P39 to Pin P72 classified to the second group G2 are arranged on the second side SD2 and the third side SD3.

Pin P1 to Pin P14 and Pin P73 to Pin P100 are classified into the third group G3. The third group G3 mainly includes pins for setting. Pin P1 to Pin P14 and Pin P73 to Pin P100 classified into the third group G3 are arranged on three sides. Specifically, Pin P1 to Pin P14 and Pin P73 to Pin P100 classified into the third group G3 are arranged on the first side SD1, the third side SD3, and the fourth side SD4.

<7. Notes>

Other than the embodiment described above, various technical features disclosed in this specification can be variously modified within the scope without deviating from the spirit of the technical invention.

For instance, in the embodiment described above, a normal liquid crystal display device displays and notifies a fault in another liquid crystal display device, but instead of notification by display, or in addition to the same, other means (such as sound or vibration) may be used for notifying a fault. In this case, the MPUs 5A and 5B should control a sound output device, a vibration generating device, or the like.

Further, in addition to the notification by a normal liquid crystal display device or the notification by other means (such as sound or vibration) other than display, the liquid crystal display device with a fault may try to display that a fault has occurred in itself.

Unlike the embodiment described above, it is possible to adopt a structure that cannot achieve the effect that, when a fault occurs in some of display devices, the fault can be securely notified, and the image that the display device with the fault cannot display can be output. In this case, one liquid crystal display device may be used solely or may be used together with other liquid crystal display device.

For instance, the liquid crystal display device is used as the display device in the embodiment described above, but a display device other than the liquid crystal display device (such as an organic electroluminescence (EL) display device) may be used.

For instance, in the liquid crystal display device 10, the obtaining unit 13B and the fault detection unit 13C are disposed inside the timing control unit 13, but the obtaining unit 13B, the fault detection unit 13C, and the reference voltage output unit 13D may be disposed not inside the timing control unit 13 but inside the system power supply IC 12.

For instance, the liquid crystal display device 10 performs the fault detection only on the basis of charging current of the pixel array 11, but it may perform the fault detection only on the basis of discharging current of the pixel array 11, or may perform the fault detection on the basis of charging current and discharging current of the pixel array 11.

Further, the obtaining unit 13B and the fault detection unit 13C may operate not only at the initial time (e.g. in an inspection before shipping from factory) and at the non-initial time (e.g. every time or every several times when the power supply to the liquid crystal display device 10 is turned on after shipping from factory), but also when a normal image display is being performed. In a normal image display, content of the display changes. Therefore, if no critical fault has occurred in the liquid crystal display device 10, charging and discharging current of the pixel array 11 must be generated in accordance with content of the display. Therefore, the fault detection unit 13C should detect a fault if no charging and discharging current of the pixel array 11 is generated (current of the pixel array 11 does not change at all) even after a predetermined time has elapsed when a normal image display is performed, for example.

Further, for example, the fault detection device disposed in the liquid crystal display device 10, i.e. the fault detection device including the obtaining unit 13B and the fault detection unit 13C may be disposed in the liquid crystal display device 9.

In other words, the embodiment described above is merely an example in every aspect and should not be interpreted as a limitation. The technical scope of the present invention should be defined not by the above description of the embodiment but by the claims, and should be understood to include all modifications within the meaning and the scope equivalent to the claims.

LIST OF REFERENCE SIGNS

1 image display system
2A left side camera
2B right side camera
3A, 3B, 7A, 7B transmitter
4A, 4B, 8A, 8B receiver
5, 5A, 5B MPU
6A, 6B GPU
9, 9A to 9C liquid crystal display device 12 system power supply IC
13 timing control IC
101 vehicle

The invention claimed is:
1. A liquid crystal display device, comprising:
a pixel array including a plurality of rows of gate lines, a plurality of columns of source lines, a plurality of switches, and a plurality of liquid crystal cells;
a gate driver integrated circuit ("IC") connected to the gate lines;
a source driver IC connected to the source lines;
a timing control IC arranged to control operation timings of the gate driver IC and the source driver IC; and
a system power supply IC arranged to supply a power supply voltage to the source driver IC,
wherein each of the timing control IC and the system power supply IC has a function of detecting an abnormality in the gate driver IC and an abnormality in the source driver IC,
wherein the liquid crystal display device further comprises:
a processing unit arranged to determine a fault aspect of the liquid crystal display device on the basis of an abnormality detection result by the timing control IC and an abnormality detection result by the system power supply IC;
a first abnormality detection informing line; and
a second abnormality detection informing line,
wherein the system power supply IC is operable to inform each of the processing unit and the timing control IC of the abnormality detection result by the system power supply IC via the first abnormality detection informing line, and
the timing control IC is operable to inform the processing unit of the abnormality detection result by the timing control IC via the second abnormality detection informing line.

2. The liquid crystal display device according to claim 1, wherein the timing control IC detects an abnormality in the source driver IC on the basis of a feedback signal from the source driver IC.

3. The liquid crystal display device according to claim 1, wherein the timing control IC detects an abnormality in the source driver IC on the basis of a voltage value of a control signal output to the source driver IC.

4. The liquid crystal display device according to claim 1, wherein the timing control IC detects an abnormality in the gate driver IC on the basis of a feedback signal from the gate driver IC.

5. The liquid crystal display device according to claim 1, wherein the system power supply IC detects an abnormality in the source driver IC on the basis of a value of the power supply voltage supplied to the source driver IC.

6. The liquid crystal display device according to claim 1, wherein the system power supply IC supplies the power supply voltage to the timing control IC, and detects an abnormality in the timing control IC on the basis of a value of the power supply voltage supplied to the timing control IC.

7. The liquid crystal display device according to claim 1, wherein
the timing control IC is a substantially rectangular semiconductor package having first, second, third and fourth sides in a plan view,
the first side is opposed to the third side, and the second side is opposed to the fourth side, and
at least some of a plurality of pins that receive an image signal are disposed on the first side, and at least some of a plurality of pins that supply output data to the gate driver IC and the source driver IC are disposed on the third side.

8. The liquid crystal display device according to claim 7, wherein a plurality of pins that receive the image signal are disposed on the first side and the second side.

9. The liquid crystal display device according to claim 8, wherein the pins disposed on the first side so as to receive the image signal are disposed close to the second side on the first side, and the pins disposed on the second side so as to receive the image signal are disposed close to the first side on the second side.

10. The liquid crystal display device according to claim 8, wherein at least either a pin that outputs a detection result about an abnormality in the gate driver IC and an abnormality in the source driver IC or a pin that receives a detection result about the abnormality in the gate driver IC and the abnormality in the source driver IC supplied from the system power supply IC is disposed on the fourth side.

11. The liquid crystal display device according to claim 7, wherein the plurality of pins that supply the output data to the gate driver IC and the source driver IC are disposed on the third side and the second side.

12. The liquid crystal display device according to claim 11, wherein the pins disposed on the third side so as to supply the output data to the gate driver IC and the source driver IC are disposed close to the second side on the third side, and the pins disposed on the second side so as to supply the output data to the gate driver IC and the source driver IC are disposed close to the third side on the second side.

13. The liquid crystal display device according to claim 11, wherein the number of pins disposed on the third side so as to supply the output data to the gate driver IC and the source driver IC is equal to or larger than the number of pins disposed on the second side so as to supply the output data to the gate driver IC and the source driver IC.

14. The liquid crystal display device according to claim 7, wherein in the timing control IC, a pin that outputs a first pulse signal to be a write start trigger for the source driver IC is disposed adjacent to a pin that receives a second pulse signal when writing of the source driver IC, which starts by the first pulse signal as a trigger, is normally performed.

15. The liquid crystal display device according to claim 7, wherein in the timing control IC, other pin is disposed between a pin that outputs a first pulse signal to be a write start trigger for the source driver IC and a pin that receives a second pulse signal when writing of the source driver IC, which starts by the first pulse signal as a trigger, is normally performed.

16. An image display system comprising a plurality of display devices, wherein
each the plurality of display devices is the liquid crystal display device according to claim 1, and
when a fault is detected in a certain display device among the plurality of display devices, at least either at least one display device other than the certain display device among the plurality of display devices or a notification device that performs notification other than display notifies that a fault is detected in the certain display device, and at least one display device other than the certain display device among the plurality of display devices displays an image for the certain display device.

17. The image display system according to claim 16, wherein when a fault is detected in a certain display device among the plurality of display devices, at least one display device other than the certain display device among the plurality of display devices displays an image for itself and an image for the certain display device in a layout corresponding to a positional relationship between itself and the certain display device.

18. A vehicle comprising the liquid crystal display device according to claim 1.

19. A liquid crystal display device, comprising:
a pixel array including a plurality of rows of gate lines, a plurality of columns of source lines, a plurality of switches, and a plurality of liquid crystal cells;
a gate driver integrated circuit ("IC") connected to the gate lines;
a source driver IC connected to the source lines;
a timing control IC arranged to control operation timings of the gate driver IC and the source driver IC; and
a system power supply IC arranged to supply a power supply voltage to the source driver IC,
wherein each of the timing control IC and the system power supply IC has a function of detecting an abnormality in the gate driver IC and an abnormality in the source driver IC,
the liquid crystal display device further comprising:
a level shifter arranged to shift a level of a control signal supplied from the timing control IC so as to send the level of the control signal to the gate driver IC,
wherein the system power supply IC detects an abnormality in the gate driver IC on the basis of a value of the power supply voltage supplied to the level shifter.

20. A liquid crystal display device, comprising:
a pixel array including a plurality of rows of gate lines, a plurality of columns of source lines, a plurality of switches, and a plurality of liquid crystal cells;
a gate driver integrated circuit ("IC") connected to the gate lines;
a source driver IC connected to the source lines;
a timing control IC arranged to control operation timings of the gate driver IC and the source driver IC;
a system power supply IC arranged to supply a power supply voltage to the source driver IC,
wherein:
each of the timing control IC and the system power supply IC has a function of detecting an abnormality in the gate driver IC and an abnormality in the source driver IC,
the timing control IC is a substantially rectangular semiconductor package having first, second, third and fourth sides in a plan view,
the first side is opposed to the third side, and the second side is opposed to the fourth side,
at least some of a plurality of pins that receive an image signal are disposed on the first side, and at least some of a plurality of pins that supply output data to the gate driver IC and the source driver IC are disposed on the third side,
a plurality of pins that receive the image signal are disposed on the first side and the second side, and
the number of pins disposed on the first side so as to receive the image signal is equal to or larger than the number of pins disposed on the second side so as to receive the image signal.

21. A liquid crystal display device comprising:
a pixel array including a plurality of rows of gate lines, a plurality of columns of source lines, a plurality of switches, and a plurality of liquid crystal cells;
a gate driver integrated circuit ("IC") connected to the gate lines;
a source driver IC connected to the source lines;
a timing control IC arranged to control operation timings of the gate driver IC and the source driver IC; and
a system power supply IC arranged to supply a power supply voltage to the source driver IC,
wherein:
each of the timing control IC and the system power supply IC has a function of detecting an abnormality in the gate driver IC and an abnormality in the source driver IC,
the timing control IC or the system power supply IC is arranged to obtain a detection result by a current detection circuit that detects at least either charging current or discharging current of the pixel array, and
wherein the timing control IC or the system power supply IC is arranged to detect a fault in the liquid crystal display device on the basis of a detection result by the current detection circuit.

22. The liquid crystal display device according to claim 21, wherein a display region of the pixel array is divided into a plurality of divided areas, and the timing control IC or the system power supply IC is operable to obtain a detection result by the current detection circuit when only a display of one of the divided areas is changed.

23. An image display system comprising a plurality of display devices, wherein
each of the plurality of display devices has a fault detection function of detecting a fault in itself, and
the image display system is operable such that when a fault is detected in a certain display device among the plurality of display devices:
at least either at least one display device other than the certain display device among the plurality of display devices or a notification device that performs notification other than display notifies that a fault is detected in the certain display device, and
at least one display device other than the certain display device among the plurality of display devices displays an image for itself and an image for the certain display device at a resolution decreased as compared with when no fault is detected in a certain display device.

* * * * *